(12) United States Patent
Lin et al.

(10) Patent No.: US 8,215,546 B2
(45) Date of Patent: Jul. 10, 2012

(54) SYSTEM AND METHOD FOR TRANSPORTATION CHECK-IN

(75) Inventors: Gloria Lin, San Ramon, CA (US); Amir M. Mikhak, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 782 days.

(21) Appl. No.: 12/286,353

(22) Filed: Sep. 30, 2008

(65) Prior Publication Data

US 2010/0078475 A1  Apr. 1, 2010

(51) Int. Cl.
*G06K 5/00* (2006.01)
(52) U.S. Cl. .................................................. 235/382
(58) Field of Classification Search .............. 35/380, 35/382, 492, 384, 435
See application file for complete search history.

(56) References Cited

U.S. PATENT DOCUMENTS

| | | |
|---|---|---|
| 4,701,601 A | 10/1987 | Francini et al. |
| 4,868,376 A | 9/1989 | Lessin et al. |
| 4,929,819 A | 5/1990 | Collins, Jr. |
| 5,239,167 A | 8/1993 | Kipp |
| 5,276,311 A | 1/1994 | Hennige |
| 5,540,301 A | 7/1996 | Dumont |
| 5,917,913 A | 6/1999 | Wang |
| 6,175,922 B1 | 1/2001 | Wang |
| 6,400,270 B1 | 6/2002 | Person |
| 6,684,269 B2 | 1/2004 | Wagner |
| 6,694,387 B2 | 2/2004 | Wagner |
| 6,910,697 B2 | 6/2005 | Varatharajah et al. |
| 7,089,214 B2 | 8/2006 | Wang |
| 7,090,126 B2 * | 8/2006 | Kelly et al. ............... 235/384 |
| 7,128,274 B2 | 10/2006 | Kelley et al. |
| 7,149,503 B2 | 12/2006 | Aarnia et al. |
| 7,240,036 B1 | 7/2007 | Mamdani et al. |
| 7,316,347 B2 | 1/2008 | Poor |
| 7,334,728 B2 | 2/2008 | Williams |
| 7,376,591 B2 | 5/2008 | Owens |
| 7,464,050 B1 | 12/2008 | Deaton et al. |

(Continued)

FOREIGN PATENT DOCUMENTS

EP  1331561 A2  7/2003

(Continued)

OTHER PUBLICATIONS

Self-Service Bag Drop Off; Self-service baggage drop off for frequent and occasional travellers; available at www.ier.fr; Jan. 11, 2009.

(Continued)

*Primary Examiner* — Seung Lee
(74) *Attorney, Agent, or Firm* — Fletcher Yoder PC

(57) ABSTRACT

There is provided a method and system for transportation check-in (e.g., ticketing and identification) via near field communication (NFC) using a handheld electronic device, such as a cellular phone or a personal media player. The handheld device may store and transmit travel reservations and traveler identifications using a travel management application. Various methods may be employed to acquire the reservation and identification information on the handheld device. For example, travel reservations may be made via the management application or may be retrieved from an email, a website, another NFC-enabled device, or a carrier-provided confirmation number. User identification may be acquired by scanning a radio frequency identification tag embedded in a government-issued I.D. In another embodiment, an I.D. number may be entered via the travel management application, and the user's identification information may be downloaded from the issuing authority.

17 Claims, 24 Drawing Sheets

U.S. PATENT DOCUMENTS

| | | | |
|---|---|---|---|
| 7,533,811 B2 * | 5/2009 | Mak | 235/384 |
| 7,558,110 B2 * | 7/2009 | Mizushima et al. | 365/185.04 |
| 2002/0082931 A1 | 6/2002 | Siegel et al. | |
| 2002/0178088 A1 | 11/2002 | Lurie et al. | |
| 2002/0193973 A1 * | 12/2002 | Kinoshita et al. | 703/1 |
| 2004/0203352 A1 | 10/2004 | Hall et al. | |
| 2004/0203636 A1 | 10/2004 | Chan et al. | |
| 2005/0116027 A1 | 6/2005 | Aigiene et al. | |
| 2005/0125343 A1 | 6/2005 | Mendelovich | |
| 2005/0131871 A1 | 6/2005 | Howard et al. | |
| 2005/0222961 A1 | 10/2005 | Staib et al. | |
| 2005/0240778 A1 * | 10/2005 | Saito | 713/186 |
| 2006/0111944 A1 | 5/2006 | Sirmans et al. | |
| 2006/0120575 A1 * | 6/2006 | Ahn et al. | 382/124 |
| 2006/0213972 A1 | 9/2006 | Kelley et al. | |
| 2006/0243609 A1 | 11/2006 | Cole et al. | |
| 2006/0266822 A1 | 11/2006 | Kelley et al. | |
| 2006/0287004 A1 | 12/2006 | Fuqua | |
| 2007/0022058 A1 | 1/2007 | Labrou et al. | |
| 2007/0043670 A1 | 2/2007 | Dionne | |
| 2007/0043678 A1 | 2/2007 | Dionne | |
| 2007/0150369 A1 | 6/2007 | Zivin | |
| 2007/0190939 A1 | 8/2007 | Abel | |
| 2007/0205275 A1 | 9/2007 | Nicola et al. | |
| 2007/0228179 A1 | 10/2007 | Atkinson | |
| 2007/0235539 A1 | 10/2007 | Sevanto et al. | |
| 2007/0255652 A1 | 11/2007 | Tumminaro et al. | |
| 2007/0265033 A1 | 11/2007 | Brostrom | |
| 2007/0278290 A1 | 12/2007 | Messerges et al. | |
| 2008/0005195 A1 | 1/2008 | Li | |
| 2008/0052243 A1 | 2/2008 | Narayanaswami et al. | |
| 2008/0059323 A1 | 3/2008 | Cheng et al. | |
| 2008/0113614 A1 | 5/2008 | Rosenblatt | |
| 2008/0154734 A1 | 6/2008 | Fernandez et al. | |

FOREIGN PATENT DOCUMENTS

| | | | |
|---|---|---|---|
| WO | 02/08863 A2 | 1/2002 | |
| WO | 2008/112497 A1 | 9/2008 | |
| WO | 2009/018255 A2 | 2/2009 | |

OTHER PUBLICATIONS

IER 506 Document printer for Boarding Passes or Baggage Tags; Multi-Purpose printer for check-in applications; available at www.ier.fr; Sep. 2007.

IER 602 The 2D Barcode Reader with Integrated RFID Technologies; The best way to enhance your communication to passengers and experience Barcode & RFID technologies; available at www.ier.fr; Dec. 2010.

IER Cuss & IMS; IER Common Use Self-Service Solutions; Self-service kiosks, IER CUSS middleware and monitoring system (IMS); available at www.ier.fr; Jan. 2009.

IER SpeedBoarding Solutions; IER SBG SpeedBoarding Gate; 2D barcoded boarding pass reader with automatic gate for self-service boarding; available at www.ier.fr; Nov. 2009.

IER Aladin IER Internet Check-in Application; ALADIN application provides fast and easy Internet check-in; available at www.ier.fr; Nov. 2009.

IER 567 Miniature ATB Printer; The smallest and most powerful ATB printer; available at www.ier.fr; Aug. 2006.

IER 560 Fast and Flexible Barcode & RFID Printer; 4 input, high throughput barcode printer for airlines and railways that need flexibility and exceptional performance; available at www.ier.fr; Nov. 2009.

IER 610 Multi-format ATB and 2D barcode Reader; Motorized ATB and 1D/2D barcode flatbed reader with unique lighting system for fast, reliable barcode reading; available at www.ier.fr; Nov. 2008.

IER WALTER IER Mobile Phone Check-in Application; IER WALTER application provides easy check-in to passengers on the move; available at www.ier.fr; Nov. 2009.

IER ALISS IER CUSS Self-Service Kiosk Check-in Application; ALISS application provides a fast and easy way to check in and print bag tags; available at www.ier.fr; Aug. 2009.

IER 400 Single Feed Dual Mode Barcode & RFID Printer; Single feed barcode printer for airlines and airports who want a simple yet flexible printer; available at www.ier.fr; Nov. 2009.

IER 600 Multi-format 2D Barcode Reader; 1D/2D barcode flatbed reader with unique lighting system for fast, reliable barcode reading on paper and telephone; available at www.ier.fr; Nov. 2009.

IER 918 Self-Service Check-In Kiosk; Compact check-in and self-tagging kiosk for airlines and airports; available at www.ier.fr; May 2010.

Baggage Processing; An Easy and Automated Bag Drop-off Solution; available at www.ier.fr; second semester, 2008.

IER MOBI-Lite Check-in/ticketing Counter; Mobile Wireless Check-in/Ticketing Counter; Reducing lines for a stress-free travel experience; available at www.ier.fr; Aug. 2006.

IER RFID Solution for Baggage Handling; available at www.ier.fr; Sep. 2007.

Air Transportation: Check-in Software; For paperless, safe and easy boarding operations; available at www.ier.fr; accessed Jan. 13, 2011.

Air Transportation: Check-in Software; Web-based powerful software to monitor kiosks installed bases; available at www.ier.fr; accessed Jan. 13, 2011.

Air Transportation: Check-in Software; Full functionality "Software Development Kit" to enable software developers to write quickly and easily CUSS compatible applications; available at www.ier.fr; accessed Jan. 13, 2011.

Air Transportation: Check-in Software; Comprehensive CUSS Kiosk Self-Service Check-in Application; available at www.ier.fr; accessed Jan. 13, 2011.

Air Transportation: Check-in Software; CUSS Middleware, to connect the kiosks to multiple airline application services; available at www.ier.fr; accessed Jan. 13, 2011.

Air Transportation: Check-in Software; An optimized solution to check in anywhere at any time; available at www.ier.fr; accessed Jan. 13, 2011.

Air Transportation: Check-in Software; An intuitive, fast, comprehensive and affordable multi-DCS Internet Check-in Application; available at www.ier.fr; accessed Jan. 13, 2011.

Email message from Herve Muller, Vice President and General Manager of IER, Inc.; dated Nov. 22, 2010.

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

NFC Forum; Near Field Communication and the NFC Forum: The Keys to Truly Interoperable Communications; http://www.nfc-forum.org/resources/white_papers/nfc_forum_marketing_white_paper.pdf; Wakefield, MA, USA 2007.

Near Field Communication in the real world part III, Moving to System on Chip (SoC) integration; http://www.nfc-forum.org/resources/white_papers/Innovision_whitePaper3.pdf ; Innovation Research & Technology plc; Gloucestershire, United Kingdom 2007.

Ricker, Thomas; Nokia's 6212 with Bluetooth NFC: Let the pairing revolution begin!; http://www.engadget.com/2008/04/15/nokias-6212-with-bluetooth-nfc-let-the-pairing-revolution-begi/; Engadget; 2008.

NFC trial in NYC enables merchant and transit payment via cell phones; Citi/ATT/MasterCard/Nokia run trial in NYC with MTA et al.; http://www.contactlessnews.com/2006/12/14/nfc-trial-in-nyc-enables-merchant-and-transit-payments-via-cell-phones ; Contactless News; 2006.

Port Authority, NJ Transit to test contactless cards; Port Authority/NJ Transit run compatible trial with NYC;http://www.contactlessnews.com/2008/02/25/port-authority-nj-transit-to-test -contactless-cards/; Contactless News 2008.

Bart NFC trial first to use mobile phones to pay for fares, food; Bart et al. run trial for automated food and transit payments; http://www.contactlessnews.com/2008/01/29/bart-nfc-trial-first-to-use-mobile-phones-to-pay-for-fares-food/ ; Contactless News 2008.

New NFC trial launched in Spokane; U.S. Bank/MasterCard run trial in Spokane, WA; http://www.contactlessnews.com/2008/01/28/new-nfc-trial-launched-in-spokane/ ; Contactless News 2008.

Ticketmaster UK & Live Nation Introduce State of the Art Access Control in Live Nation Theatres; Ticketmaster Press Release; Jul. 28, 2008.

* cited by examiner

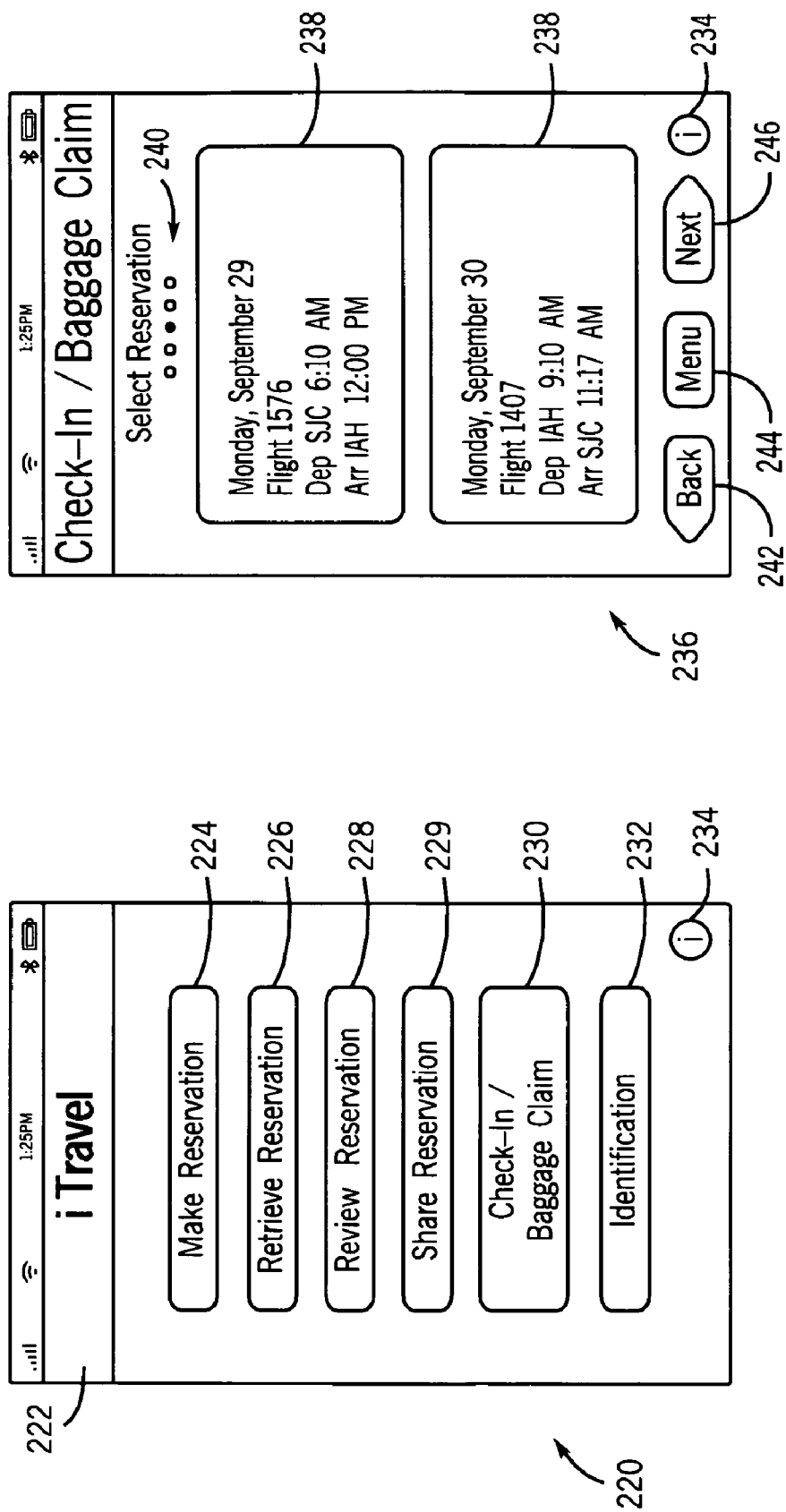

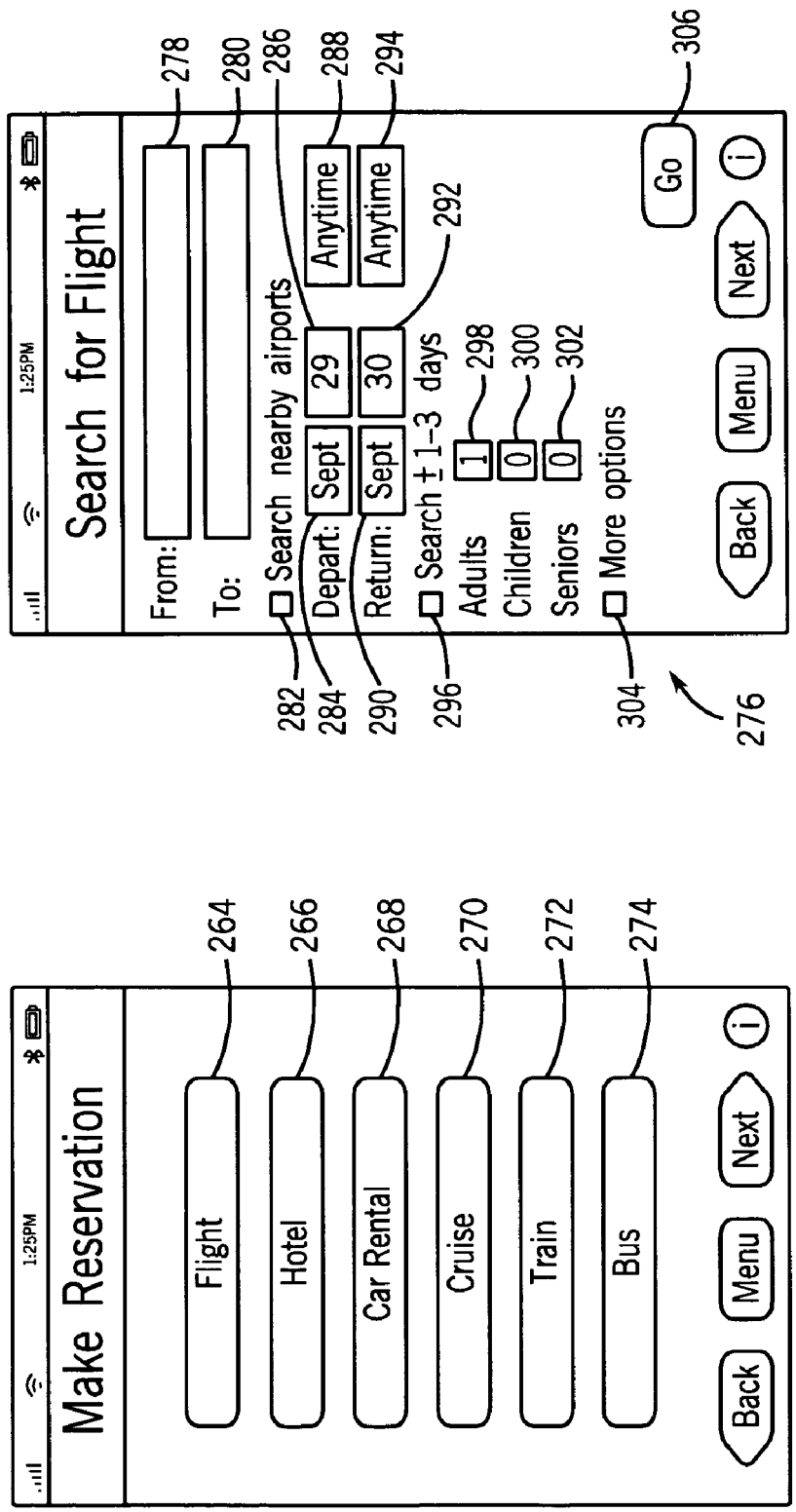

Passenger Information

Traveler 1: John Smith — 312
First name: — 314
Last name: — 316
Seat request: ☐ Aisle ☐ Window — 318
Frequent flyer #: — 320
☐ Save traveler information — 322

Traveler 2: John Smith — 312
First name: — 314
Last name: — 316
Seat request: ☐ Aisle ☐ Window — 318
Frequent flyer #: — 320
☐ Save traveler information — 322

Back  Menu  Next  Go — 324

FIG. 16

Select Departure Flight

| Airline | Dep | Arr | Stops | Price |
|---|---|---|---|---|
| Frontier Airlines MKE | 6:10am | 7:51am DEN | 0 | $99 |
| Delta Air Lines MKE | 9:10am | 6:24pm DEN | 2 | $304 |
| Midwest Airlines MKE | 2:57pm | 5:59pm DEN | 1 | $409 |

Back  Menu  Next

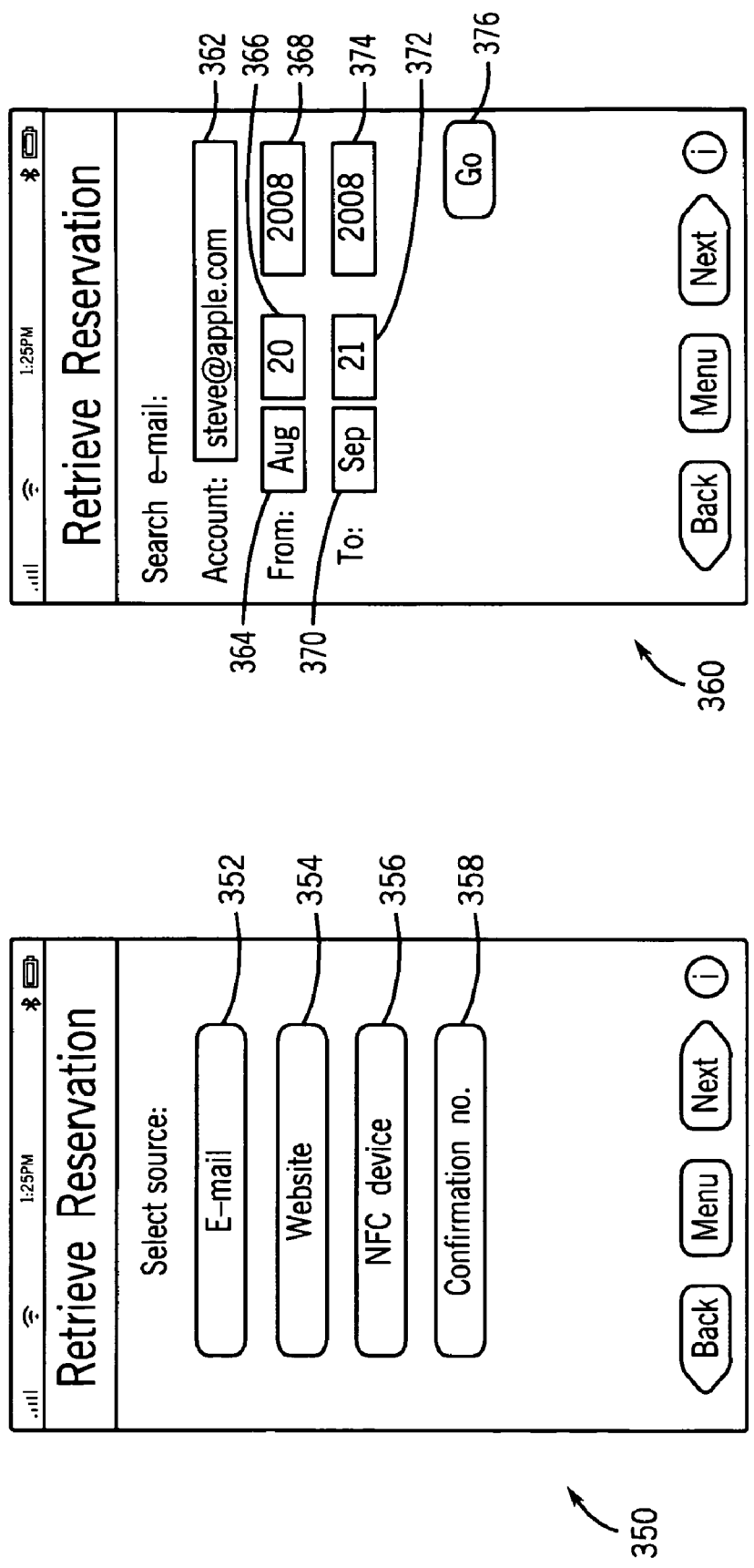

FIG. 23

Retrieve Reservation

E-mail search results:

Continental Airlines, Inc. 8/23/08
Flight #507

Southwest Airlines, Inc. 8/30/08
Flight #496

Continental Airlines, Inc. 9/02/08
Flight #287

Hertz car rental        9/02/08
Car #32415

Back  Menu  Next  ⓘ

Retrieve Reservation

Add reservation — 382

Hertz Car Rental

Pickup:
    HOU  Oct 8  3:30 PM

Return:
    HOU  Oct 10  10:00 AM

Reservation #: ABC24

Back  Menu  Next  ⓘ

380

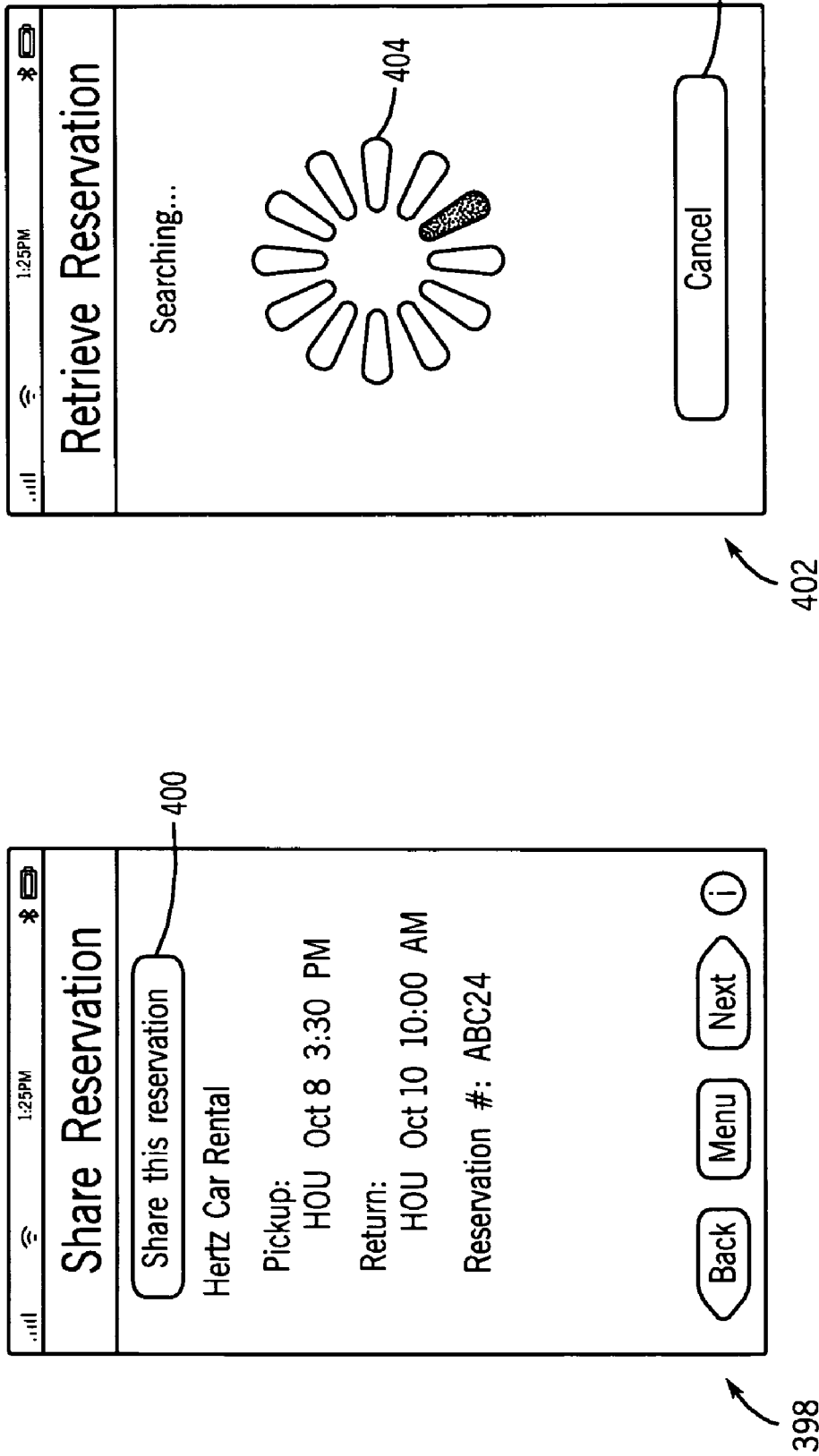

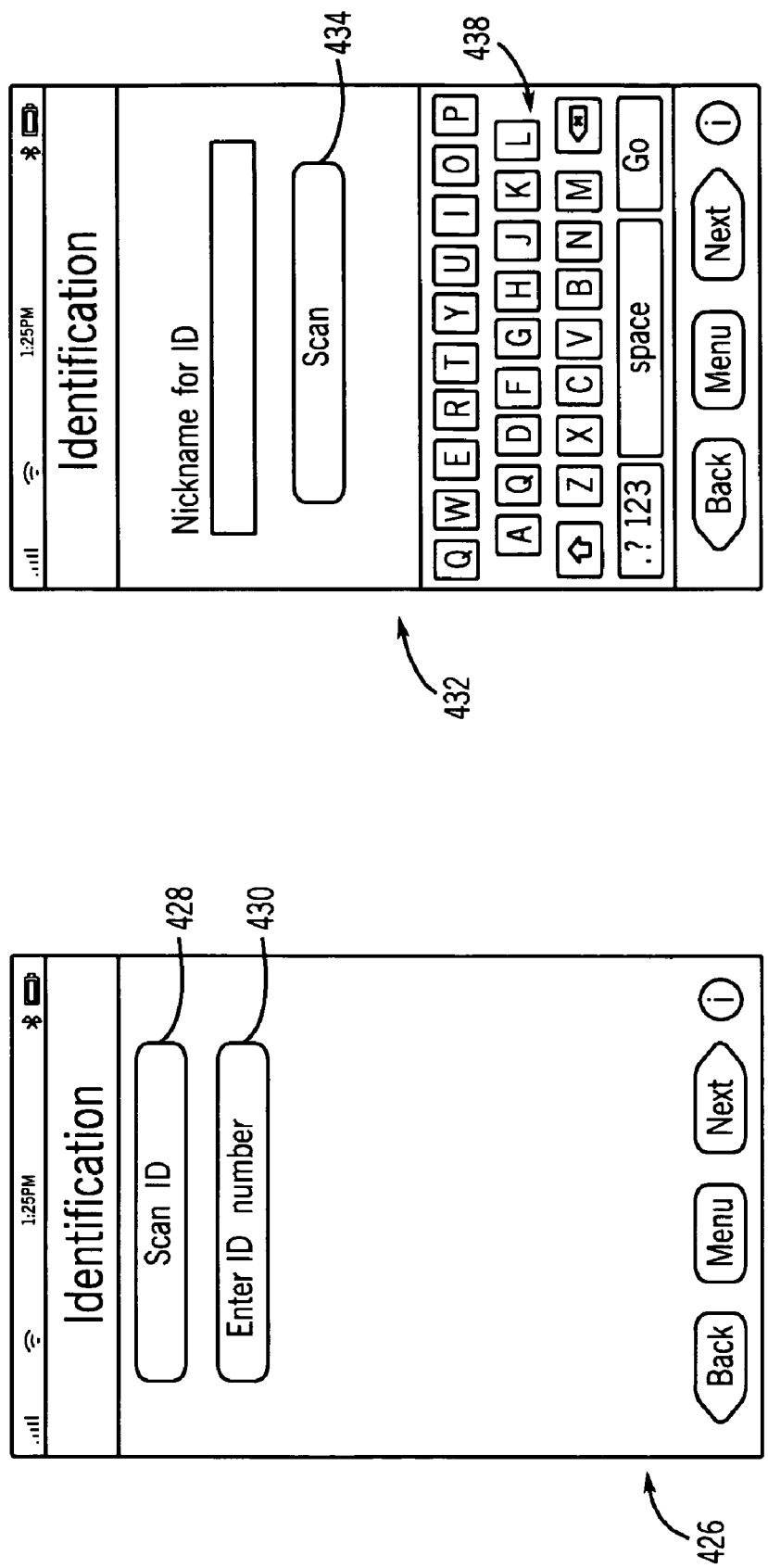

Identification

Transmit Identification

Nickname: John – Passport
Name: John W. Smith
DOB: 12/25/75
Passport #: 321FA7
Country of Citizenship: US
Address: 123 Main St.
Cupertino, CA Back  Menu  Next

FIG. 38

Identification

Select Identification

John – Passport
John – DL
Mary – Passport
Billy – Passport

Back  Menu  Next

FIG. 37

SYSTEM AND METHOD FOR TRANSPORTATION CHECK-IN

BACKGROUND

1. Technical Field

The present disclosure relates generally to transportation check-in and, more particularly, to employing near field communication for identification and ticketing by transportation providers.

2. Description of the Related Art

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

Transportation ticketing has traditionally involved a pre-printed ticket which is scanned at a departure station. For example, transportation tickets may be printed at home with a barcode or a QR code (i.e., a 3-dimensional barcode) encoded with information about the traveler and/or the travel (e.g., name, destination, departure time, schedule number, etc.). In addition, this information may be included in plain language on the printed ticket. A traveler may be required to present this pre-printed ticket to gain admission to the transportation depot (e.g., airport, train station, but station, etc.), to pass through a security check-point, and/or to board the vehicle for transportation.

For example, in order to board an airplane at an airport, a traveler may be asked to present his pre-printed ticket in order to check in to his flight, to pass through the Transportation Security Administration (TSA) checkpoint, and to enter the gangway to board the airplane. The traveler may also be required to present photo identification at some or all of these locations. The ticket and/or identification may also be required to retrieve luggage from a baggage claim station at the traveler's destination. In addition to carrying the ticket and identification, the traveler may be carrying luggage and/or carryon bags to the ticket counter; bags, a laptop, and shoes through the TSA checkpoint; and carryon bags onto the airplane. Juggling multiple items while presenting a paper ticket and identification is often inconvenient and may lead to forgotten items, lost tickets and/or identification, and other hassles.

Furthermore, printing out paper tickets consumes natural resources and costs money every time a ticket is printed. Indeed, many airlines charge a traveler considerable fees to receive an airline-printed ticket. Accordingly, a traveler is generally expected to have a pre-printed ticket in his hands upon arrival at the transportation depot.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

Accordingly, there is provided a handheld electronic device, such as a cellular phone or a personal media player, which may enable traveler check-in for travel. That is, ticketing and identification information may be stored on the handheld electronic device and transmitted, such as via near field communication, to another electronic device. The handheld device may be used to check into flights, hotels, car rentals, cruises, trains, buses, and so forth.

In addition, traveler identification information may be transmitted electronically to enable faster security verification during check-in. The traveler identification information may enable automatic lookup of the traveler in a security database, thereby reducing the inconveniences of incorrect identification. Travelers may also provide specialized identification, such as fingerprints or retinal scans, in order to provide heightened security on high-risk modes of transportation.

Travel information may be managed on the handheld device by a travel management application. Ticketing and reservation information may be entered into the application via several methods. For example, reservations may be made through the travel management application. In another embodiment, reservations may be retrieved from an email, a website, another electronic device, or via a carrier-provided confirmation number. Additional reservation retrieval methods may be employed, such as, for example, acquiring digital images of travel documents and extracting reservation images via optical character recognition software, barcode-reading software, or QR-code-reading software.

Identifications may also be managed via the travel management application. I.D.s, such as passports or driver's licenses, may be loaded onto the handheld device via, for example, scanning a radio frequency identification tag embedded in the I.D., or entering an I.D. number and looking up the corresponding identification information. Again, additional identification retrieval methods may be employed.

BRIEF DESCRIPTION OF THE DRAWINGS

Advantages of the invention may become apparent upon reading the following detailed description and upon reference to the drawings in which:

FIG. 9 is a schematic of a screen shot of a travel management application on the electronic device of FIG. 1 in accordance with aspects of the present disclosure;

FIGS. 10-12 are schematics of screen shots of a check-in and/or baggage claim function of the travel management application on the electronic device of FIG. 1 in accordance with aspects of the present disclosure;

FIGS. 13-19 are schematics of screen shots of a travel reservation function of the travel management application on the electronic device of FIG. 1 in accordance with aspects of the present disclosure;

FIGS. 21-27 are schematics of screen shots of a reservation retrieval function of the travel management application on the electronic device of FIG. 1 in accordance with aspects of the present disclosure;

FIGS. 28 and 29 are schematics of screen shots of a reservation sharing function of the travel management application on the electronic device of FIG. 1 in accordance with aspects of the present disclosure;

FIGS. 30 and 31 are schematics of screen shots of a reservation retrieval function of the travel management application on the electronic device of FIG. 1 in accordance with aspects of the present disclosure;

FIGS. 33-36 are schematics of screen shots of an identification retrieval function of the travel management application on the electronic device of FIG. 1 in accordance with aspects of the present disclosure;

FIGS. 37 and 38 are schematics of screen shots of an identification transmittal function of the travel management application on the electronic device of FIG. 1 in accordance with aspects of the present disclosure.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
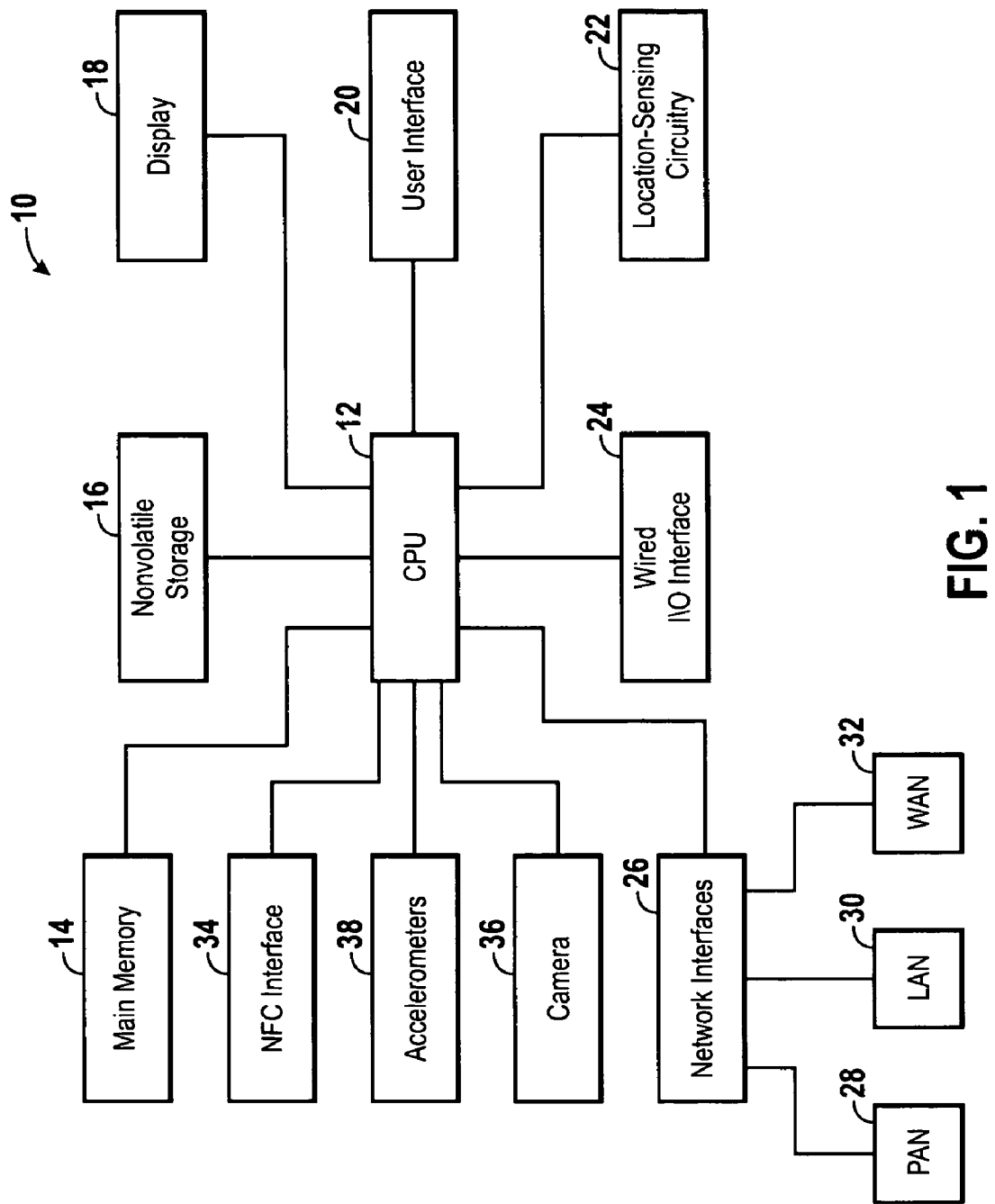
FIG. 1 is a block diagram of an electronic device in accordance with aspects of the present disclosure.

Turning first to FIG. 1, an electronic device 10 may be configured for obtaining, storing, or using electronic tickets and/or identification for transportation. As discussed below with reference to FIGS. 2-7, the electronic device 10 may be, among other things, a handheld device, a computer, or a media player adapted to obtain, store, or use electronic travel reservations and/or identification, collectively referred to as travel documents, using techniques described in greater detail below; a manned or unmanned kiosk to sell or distribute electronic transportation tickets to another electronic device 10 and/or to enable transportation check-in using another electronic device 10; or an electronic ticket reader to present identification and/or transportation ticketing information upon receipt of travel documents from another electronic device 10. As such, the electronic device 10 may be, for example, an iPhone®, iPod®, iMac®, or MacBook®, available from Apple Inc., or similar devices by any manufacturer. It should be appreciated that embodiments of the electronic device 10 may include more or fewer elements than those shown in FIG. 1.

The electronic device 10 may include at least one central processing unit (CPU) 12. For example, the CPU 12 may include one or more microprocessors, and the microprocessors may be "general purpose" microprocessors, a combination of general and special purpose microprocessors, or ASICS. Additionally or alternatively, the CPU 12 may include one or more reduced instruction set (RISC) processors, video processors, or related chip sets. The CPU 12 may provide processing capability to execute an operating system, run various applications, and/or provide processing for one or more of the techniques described herein. Exemplary applications that may run on the electronic device 10 include a music player, a video player, a picture displayer, a calendar, an address book, an email client, a telephone dialer, and so forth. In addition, software for managing electronic travel documents may be included on the electronic device 10, as described below.

A main memory 14 may be communicably coupled to the CPU 12, which may store data and executable code. The main memory 14 may represent volatile memory such as RAM, but may also include nonvolatile memory, such as read-only memory (ROM) or Flash memory. In buffering or caching data related to operations of the CPU 12, the main memory 14 may store data associated with open applications running on the electronic device 10.

The electronic device 10 may also include nonvolatile storage 16. The nonvolatile storage 16 may represent any suitable nonvolatile storage medium, such as a hard disk drive or nonvolatile memory, such as flash memory. Being well-suited to long-term storage, the nonvolatile storage 16 may store data files such as media (e.g., music files, video files, pictures, etc.), software (e.g., for implementing functions on the electronic device 10), preference information (e.g., media playback preferences, desktop background image, ringtones, etc.), transaction information (e.g., credit card data, records of transactions, etc.), wireless connection information (e.g., wireless network names and/or passwords, cellular network connections, etc.), subscription information (e.g., a record of podcasts, television shows, or other media to which a user subscribes), as well as personal information (e.g., contacts, calendars, email, etc.). Additionally, travel document data may be saved in the nonvolatile storage 16, as discussed further below.

In certain embodiments, a display 18 of the electronic device 10 may display images and/or data. The display 18 may be any suitable display, such as a liquid crystal display (LCD), a plasma display, an electronic paper display (e.g., E Ink), a light emitting diode (LED) display, an organic light emitting diode (OLED) display, a cathode ray tube (CRT) display, or an analog or digital television. In some embodiments, the display 18 may include touch screen or multi-touch screen technology through which a user may interface with the electronic device 10.

The electronic device 10 may further have a user interface 20. The user interface 20 may include, for example, indicator lights, user inputs, and/or a graphical user interface (GUI) on the display 18. In practice, the user interface 20 may operate via the CPU 12, using memory from the main memory 14 and long-term storage in the nonvolatile storage 16. In an embodiment lacking the display 18, indicator lights, sound devices, buttons, and other various input/output (I/O) devices may allow a user to interface with the electronic device 10. In an embodiment having a GUI, the user interface 20 may provide interaction with interface elements on the display 18 via certain user input structures, user input peripherals such as a keyboard or mouse, or a touch sensitive implementation of the display 18.

At a given time, one or more applications may be open and accessible to a user via the user interface 20 and/or displayed on the display 18 of the electronic device 10. The applications may run on the CPU 12 in conjunction with the main memory 14, the nonvolatile storage 16, the display 18, and the user interface 20. Various data may be associated with each open application. As will be discussed in greater detail below, instructions stored in the main memory 14, the nonvolatile storage 16, or the CPU 12 of the electronic device 10 may obtain, store, and use electronic travel documents. Rather than manage paper tickets and photo ID cards, a user may employ the electronic device 10 to manage travel documents electronically. As such, it should be appreciated that the instructions for carrying out such techniques may represent a standalone application, a function of the operating system of the electronic device 10, or a function of the hardware of the CPU 12, the main memory 14, the nonvolatile storage 16, or other hardware of the electronic device 10.

In certain embodiments, the electronic device 10 may include location sensing circuitry 22. The location sensing circuitry 22 may represent global positioning system (GPS) circuitry, but may also represent one or more algorithms and databases, stored in the nonvolatile storage 16 or main memory 14 and executed by the CPU 12, which may be used to infer location based on various observed factors. For example, the location sensing circuitry 22 may include an algorithm and database used to approximate geographic location based on the detection of local wireless networks (e.g., 802.11x, otherwise known as Wi-Fi) or nearby cellular phone towers. As discussed below, the electronic device 10 may employ the location sensing circuitry 22 as a factor for carrying out certain ticketing and/or identification management techniques. By way of example, the location sensing circuitry 22 may be used by the electronic device 10 to determine a user's location during an event; the location during the event may then affect and/or determine the information displayed on the electronic device 10.

With continued reference to FIG. 1, the electronic device 10 may also include a wired input/output (I/O) interface 24 for a wired interconnection between one electronic device 10 and another electronic device 10. The wired I/O interface 24 may be, for example, a universal serial bus (USB) port or an IEEE 1394 port (e.g., FireWire®, available from Apple Inc.), but may also represent a proprietary connection. Additionally, the wired I/O interface 24 may permit a connection to peripheral user interface devices, such as a keyboard or a mouse.

One or more network interfaces 26 may provide additional connectivity for the electronic device 10. The network interfaces 26 may include, for example, one or more network interface cards (NIC) or a network controller. In certain embodiments, the network interface 26 may include a personal area network (PAN) interface 28. The PAN interface 28 may provide capabilities to network with, for example, a Bluetooth® network, an IEEE 802.15.4 (e.g., ZigBee) network, or an ultra wideband (UWB) network. As should be appreciated, the networks accessed by the PAN interface 28 may, but do not necessarily, represent low power, low bandwidth, or close range wireless connections. The PAN interface 28 may permit one electronic device 10 to connect to another local electronic device 10 via an ad-hoc or peer-to-peer connection. However, the connection may be disrupted if the separation between the two electronic devices 10 exceeds the range of the PAN interface 28.

The network interface 26 may also include a local area network (LAN) interface 30. The LAN interface 30 may be, for example an interface to a wired Ethernet-based network or an interface to a wireless LAN, such as a Wi-Fi network. The range of the LAN interface 30 may generally exceed the range available via the PAN interface 28. Additionally, in many cases, a connection between two electronic devices 10 via the LAN interface 30 may involve communication through a network router or other intermediary device.

Additionally, for some embodiments of the electronic device 10, the network interfaces 26 may include the capability to connect directly to a wide area network (WAN) via a WAN interface 32. The WAN interface 32 may permit a connection to a cellular data network, such as the Enhanced Data rates for GSM Evolution (EDGE) network, a 3G network, or another cellular network. When connected via the WAN interface 32, the electronic device 10 may remain connected to the Internet and, in some embodiments, to another electronic device 10, despite changes in location that might otherwise disrupt connectivity via the PAN interface 28 or the LAN interface 30. As will be discussed below, the wired I/O interface 24 and the network interfaces 26 may represent high-bandwidth communication channels for transferring user data using the simplified data transfer techniques discussed herein.

Certain embodiments of the electronic device 10 may also include a near field communication (NFC) interface 34. The NFC interface 34 may allow for extremely close range communication at relatively low data rates (e.g., 424 kb/s), and may comply with such standards as ISO/IEC 18092, ECMA-340, ISO/IEC 21481, ECMA-352, ISO 14443, and/or ISO 15693. The NFC interface 34 may have a range of approximately 2-4 cm. The close range communication with the NFC interface 34 may take place via magnetic field induction, allowing the NFC interface 34 to communicate with other NFC interfaces 34 or to retrieve information from tags having radio frequency identification (RFID) circuitry. As described below, the NFC interface 34 may enable initiation and/or facilitation of data transfer of from one electronic device 10 to another electronic device 10.

The electronic device 10 of FIG. 1 may also include a camera 36. With the camera 36, the electronic device 10 may obtain digital images and/or videos. In combination with optical character recognition (OCR) software, barcode-reading software, or QR-code-reading software running on the electronic device 10, the camera 36 may be used to input data from printed materials having text or barcode information.

In addition, in certain embodiments of the electronic device 10, one or more accelerometers 38 may be included which sense the movement and/or orientation of the electronic device 10. The accelerometers 38 may provide input or feedback regarding the position of the electronic device 10 to certain applications running on the CPU 12. By way of example, the accelerometers 38 may include a 3-axis accelerometer from ST Microelectronics.

Figure 2:
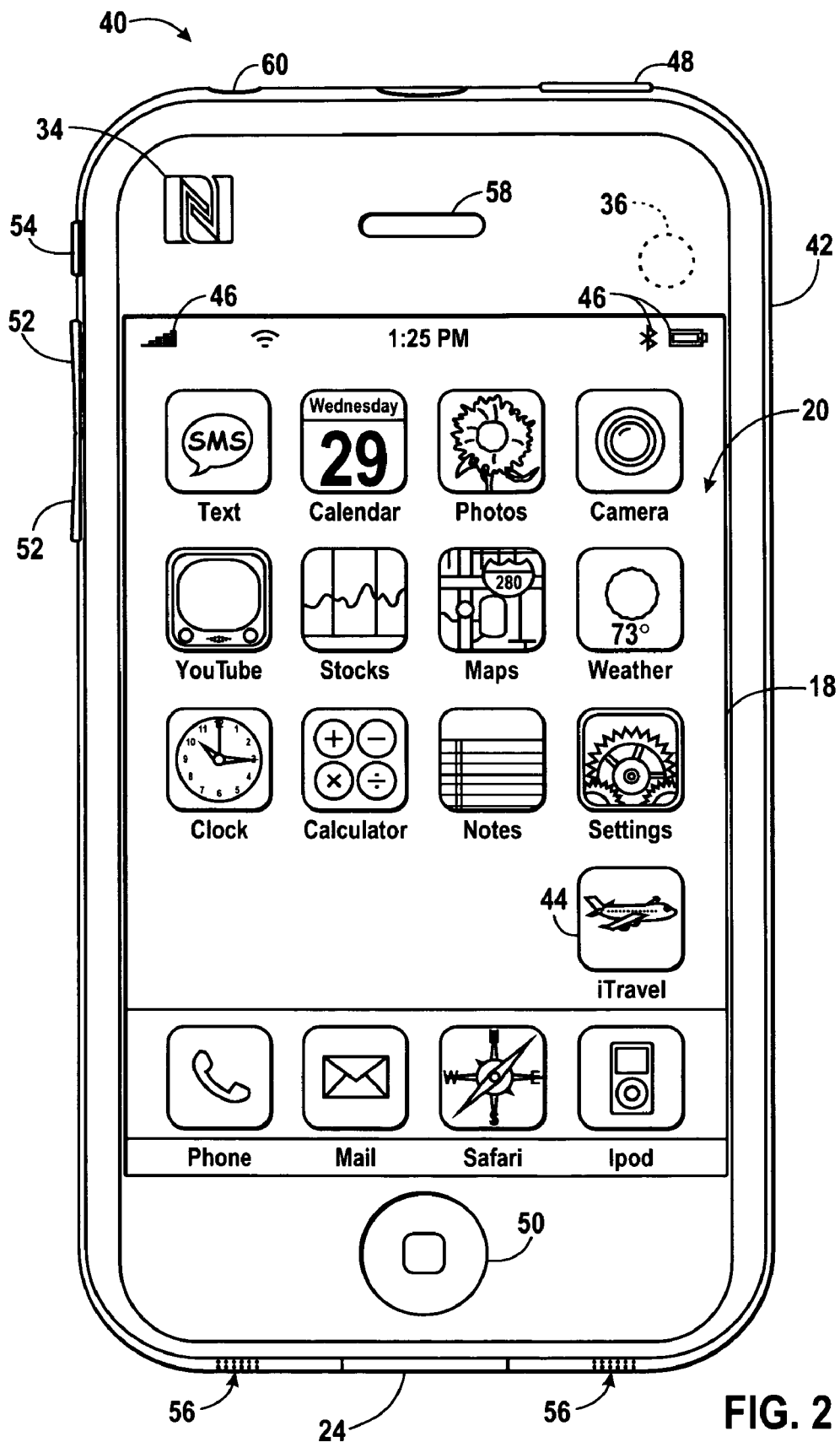
FIG. 2 is a front view of an embodiment of the electronic device of FIG. 1 in accordance with aspects of the present disclosure.

FIGS. 2-7 illustrate various specific embodiments of the electronic device 10 of FIG. 1. For example, the electronic device 10 of FIG. 1 may be a handheld device 40, as illustrated in FIG. 2. The exemplary handheld device 40 may be a portable phone and/or a portable media player, such as an iPhone® or an iPod® available from Apple Inc.

The handheld device 40 may have an enclosure 42 of plastic, metal, composite materials, or other suitable materials in any combination. The enclosure 42 may protect the interior components of the handheld device 40 from physical damage and electromagnetic interference (EMI). Additionally, the enclosure 42 may allow certain frequencies of electromagnetic radiation to pass to and/or from wireless communication circuitry within the handheld device 40 to facilitate wireless communication.

The display 18 of the handheld device 40 may include the user interface 20 in the form of a GUI, which may have a number of individual icons representing applications that may be activated. The user interface 20 on the display 18 of the handheld device 40 may also include certain status indicator icons 46, which may indicate the status of various components of the handheld device 40. For example, the status indicator icons may include a cellular reception meter, an icon to indicate when the PAN interface 28 is active (e.g., when a Bluetooth® network is in use), or a battery life meter.

In some embodiments, a travel management application icon 44 may be selectable by a user. For example, the display 18 may serve as a touch-sensitive input device, and icons may be selected by touch. Here, the travel management application icon 44 is designated as "iTravel" to indicate to a user that selection of the icon 44 will allow the user to store and use travel documents, including transportation tickets and/or identification. When the travel management application icon 44 is selected, the travel management application may open, as described further below. The travel management application may enable a user to obtain, store, or use electronic travel documents to gain entry to a terminal, depot, station, mode of transportation, and so forth.

The handheld device 40 may connect to another electronic device 10, such as a computer, through the wired I/O interface 24. For example, the wired I/O interface 24 may be a proprietary connection for coupling the handheld device 40 to another electronic device 10 via USB or FireWire®. Once connected, the devices 10 may synchronize and/or transfer certain data, such as electronic travel documents, in accordance with techniques discussed herein.

User input structures 48, 50, 52, and 54 may supplement or replace the touch-sensitive input capability of the display 18 for interaction with the user interface 20. By way of example, the user input structures 48, 50, 52, and 54 may include buttons, switches, a control pad, keys, knobs, a scroll wheel, or any other suitable input structures. The user input structures 48 and 50 may work in conjunction with the display 18 to control functions of the device. Particularly, the user input structure 48 may be an on/off button; the user input structure 50 may be a navigation button for navigating the user interface 20 to a default or home screen; the user input structures 52 may be a pair of buttons for controlling volume and/or for navigating up and down a screen of the user interface 20; and the user input structure 54 may be a sliding button which mutes the handheld device 40 or which "locks" and "unlocks" the device 40.

In addition, the handheld device 40 may include audio input and/or output structures. For example, audio structures 56 may include one or more microphones for receiving voice data from a user and/or one or more speakers for outputting audio data, such as songs, ringtones, sound tracks associated with videos, voice data received by the handheld device 40 over a cellular network, and so forth. In addition, an audio structure 58 may include a speaker for output audio data, such as voice data received by the handheld device 40 over the cellular network. In certain embodiments, an audio port 60 may also enable connection of peripheral audio input and output devices, such as headsets, speakers, or microphones, for use with the handheld device 40.

As noted above, some embodiments of the electronic device 10 may include the NFC interface 34. The handheld device 40 depicted in FIG. 2 may include the NFC interface 34 in any suitable location within the enclosure 42. Because the NFC interface 34 may permit communication at a very short range, the location of the NFC interface 34 in the handheld device 40 may be indicated on the exterior of the enclosure 42, as illustrated in FIG. 2. The NFC interface 34 may enable the handheld device 40 to communicate with RFID tags and/or other NFC-enabled electronic devices 10. For example, the NFC interface 34 may enable transmission of electronic travel documents to transportation and/or security personnel, as described further below.

Additionally, the camera 36 may be located, for example, on the back of the handheld device 40. As discussed further below, the camera 36 may be used to obtain a digital images of travel documents. The handheld device 40 may thereafter employ optical character recognition (OCR) software, barcode reading software, and/or QR code reading software to extract ticket information from the image, as described further below.

The handheld device 40 may also include the location sensing circuitry 22 and/or the accelerometers 38. Certain applications running on the handheld device 40 may obtain information about the location, orientation, and/or movement of the handheld device from the location sensing circuitry 22 and/or the accelerometers 38. This information may enable applications to display personalized data or to display data in an innovative manner in response to a user's location and/or movement. For example, the travel management application may acquire the user's location via the location sensing circuitry 22 as a security measure, as discussed in more detail below.

Figure 3:
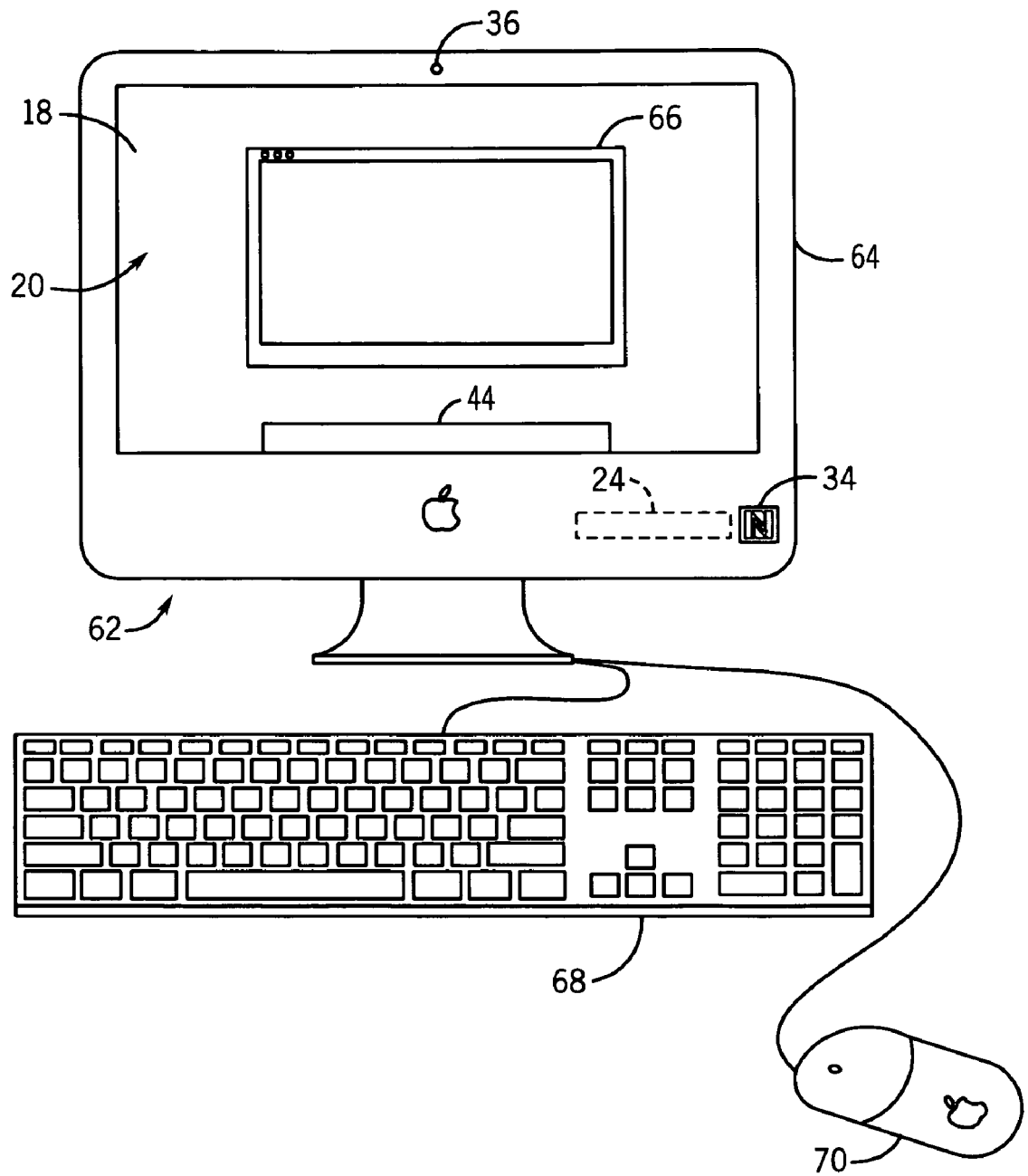
FIG. 3 is a front view of another embodiment of the electronic device of FIG. 1 in accordance with aspects of the present disclosure.

Another embodiment of the electronic device 10 of FIG. 1 may be a computer 62, as illustrated in FIG. 3. The computer 62 may be any computer, such as a desktop computer, a server, or a notebook computer, but may also be a standalone media player or video gaming machine. By way of example, the computer 62 may be an iMac®, a MacBook®, or an AppleTV® by Apple Inc. In addition, the computer 62 may be a personal computer (PC) from another manufacturer. An enclosure 64 may protect internal components of the computer 62. Such internal components may include, for example, the CPU 12, the main memory 14, the nonvolatile storage 16, certain network interfaces 26, and/or the NFC interface 34, as illustrated in FIG. 1.

The NFC interface 34 may permit near field communication between the computer 62 and other NFC enabled electronic devices 10, such as the handheld device 40. Accordingly, the location of the NFC interface 34 within the enclosure 64 may be noted by a label on the exterior of the enclosure 64 to enable positioning of other NFC enabled electronic devices 10 within the short range of the NFC interface 34. Additionally, the NFC interface 34 may also enable the computer 62 to receive electronic ticket data from an RFID tag located on a ticket, as described further below.

The user interface 20 may be displayed on the display 18 of the computer 62 in the form of a GUI. The user interface 20 may display, for example, user interfaces for applications 66 running on the computer 62. Additionally, the user interface 20 may include a variety of icons related to applications installed on the computer 62, such as the travel management application icon 44. When the travel management application icon 44 is selected, another version of the travel management application optimized for the computer 62 may open. The travel management application may enable a user to obtain, store, or use travel documents, as described further herein.

A user may interact with the user interface 20 via various peripheral input devices, such as a keyboard 68 and/or a mouse 70. Peripherals may connect to the computer 62, for example, via the wired I/O interface 24 and/or the PAN interface 28 (e.g., Bluetooth®). The wired I/O interface 24 may also provide a high bandwidth communication channel for coupling other electronic devices 10, such as the handheld device 40, to the computer 62.

The computer 62 may also include the camera 36. As discussed further below, the camera 36 may obtain, among other things, a digital image of a transportation ticket and/or identification. With the digital image, the computer 62 and/or the handheld device 40 may employ optical character recognition (OCR) software, barcode-reading software, or QR-code-reading software to extract ticket information from the image.

Figure 4:
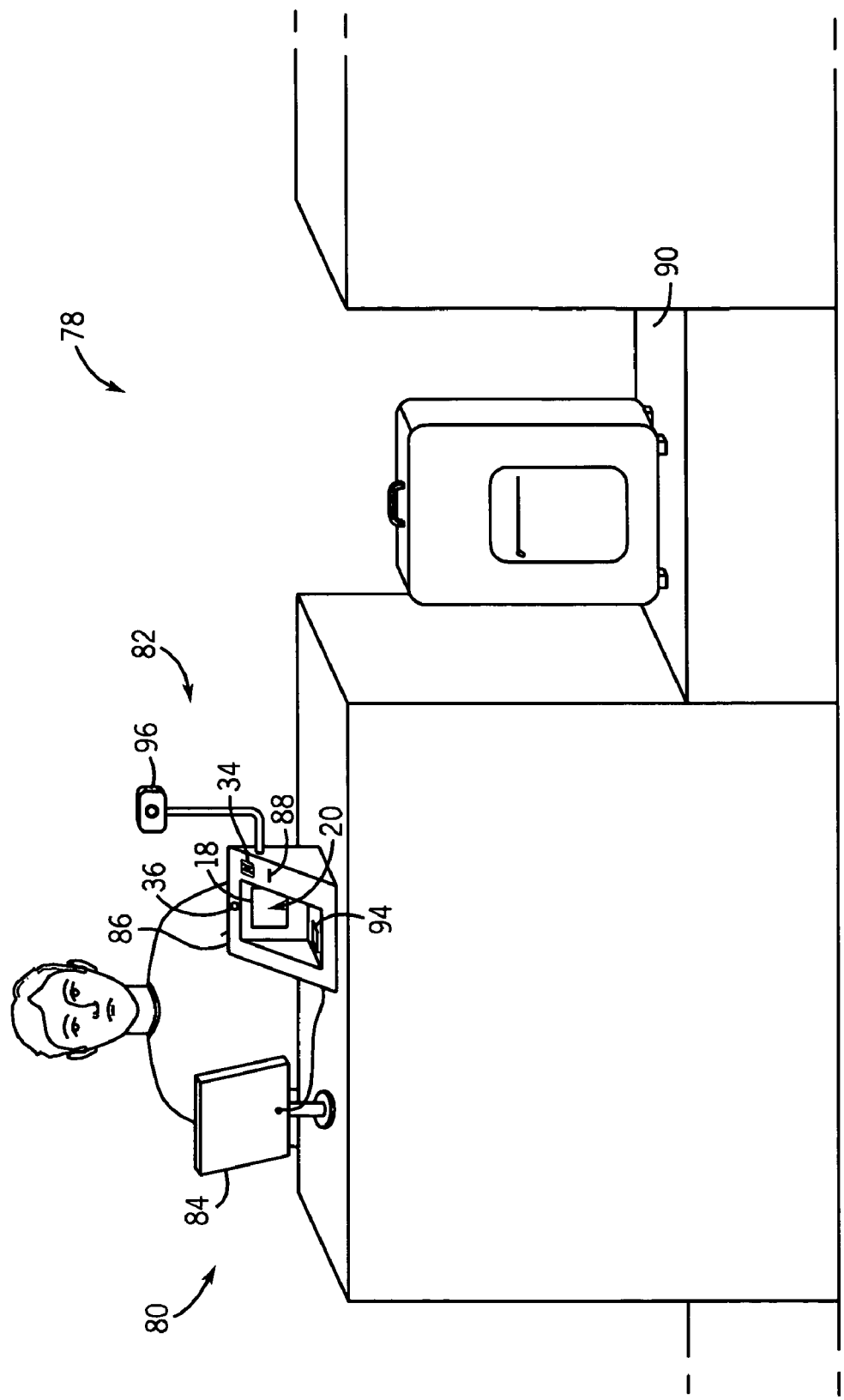
FIG. 4 is a perspective view of a ticketing and baggage check counter kiosk including an embodiment of the electronic device of FIG. 1 in accordance with aspects of the present disclosure.

Turning to FIG. 4, a perspective view of a ticketing and baggage check counter 78 having an NFC-enabled counter kiosk 80, another embodiment of the electronic device 10 of FIG. 1, is illustrated. The NFC-enabled counter kiosk 80 may communicate with another electronic device 10, such as the handheld device 40, to purchase a transportation ticket and/or to check in for travel. For example, as described further below, a user may purchase or otherwise obtain an electronic travel ticket from the counter kiosk 80. The user may also use an electronic travel ticket and/or electronic identification at the counter kiosk 80 to check in for travel, including checking in luggage. As described in more detail below, the electronic travel ticket may include a unique identifier, such as a digital code, which may be utilized to look up and/or alter information regarding a traveler's reservation in a networked database.

The counter kiosk 80 may generally include a traveler interface 82 and an agent interface 84. The traveler interface 82 may have an integrated or separate NFC interface 34 within an enclosure 86. The NFC interface 34 may permit near field communication between the counter kiosk 80 and other NFC enabled electronic devices 10, such as the handheld device 40. Accordingly, the location of the NFC interface 34 within the enclosure 86 may be noted by a label on the exterior of the enclosure 86 to enable positioning of other NFC enabled electronic devices 10 within the short range of the NFC interface 34. The traveler interface 82 may also include the display 18 having the user interface 20 (e.g., a touch-screen display) and a credit card scanner 88. A luggage scale 90 may also be coupled to or in communication with the counter kiosk 80 to enable detection and weighing of the traveler's luggage.

To enable purchase and/or redemption of an electronic travel ticket, the traveler interface 82 may communicate with the agent interface 84 and various other computers over a variety of networks using the network interfaces 26 (FIG. 1). By way of example, the traveler interface 82 may be coupled to the agent interface 84 via a direct connection or a LAN. The counter kiosk 80 may communicate with a local server over a local network or a web service over the Internet. The local server or the web service may track, for example, reservation information, whether a traveler has checked in, if the traveler has checked in any bags, and so forth.

In addition, traveler identification information, such as a photograph, fingerprint, or retinal scan, may be accessed from the local server or the web service for verification of the traveler's identity. The camera 36, a fingerprint scanner 94, and/or a retina scanner 96 may also be incorporated into the traveler interface 82 to enable enhanced traveler identification for security purposes, as described in more detail below.

Figure 5:
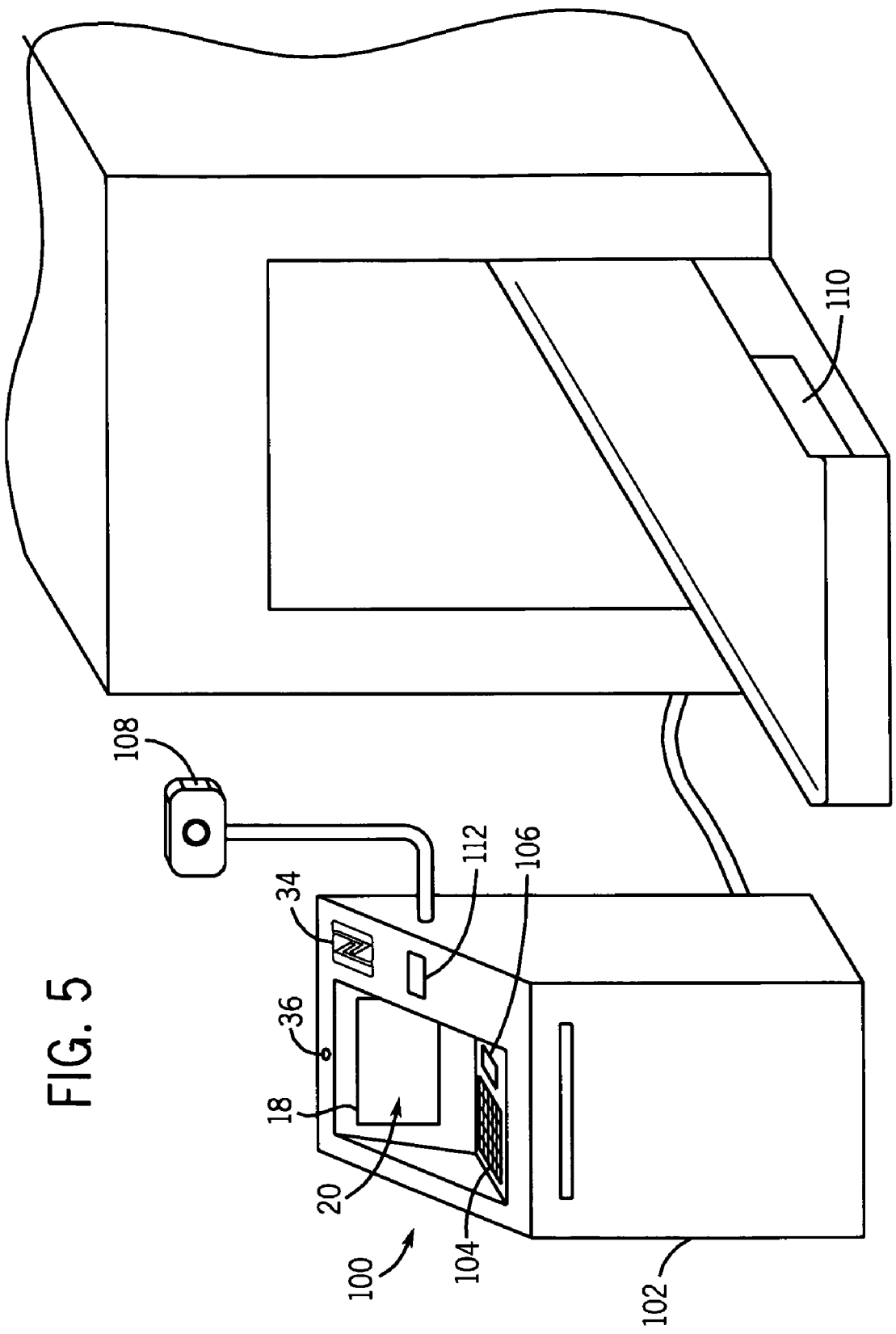
FIG. 5 is a perspective view of an unmanned ticketing and baggage check kiosk including an embodiment of the electronic device of FIG. 1 in accordance with aspects of the present disclosure.

FIG. 5 illustrates an NFC-enabled unmanned kiosk 100, which may be another embodiment of the electronic device 10 of FIG. 1. The unmanned kiosk 100 may be configured to enable a user of another electronic device 10, such as the handheld device 40, to obtain an electronic travel reservation or to check in using an existing electronic travel reservation. The unmanned kiosk 100 may function largely in the same manner as the counter kiosk 80 of FIG. 4, but may operate without a human agent. For example, as described below, a user may purchase or otherwise obtain an electronic travel reservation from the unmanned kiosk 100, or the user may access an existing reservation and check in for travel at the unmanned kiosk 100.

An enclosure 102 may protect the internal components of the unmanned kiosk 100 from its particular environment. For example, the enclosure 102 may include weather resistant material and sealant if the unmanned kiosk 102 is to be located outdoors. Among the components housed within the enclosure 102 may be the NFC interface 34. The NFC interface may enable a user to interact with the unmanned kiosk 100 using an NFC-enabled electronic device 10 or an NFC-enabled card. The unmanned kiosk 100 may also include other elements of the electronic device 10 described above with reference to FIG. 1, such as the display 18 having the user interface 20. The display 18 may be a touch-screen display; in addition, or alternately, the unmanned kiosk 100 may include a keypad 104 to enable user interaction with the kiosk 100.

As noted above with reference to the counter kiosk 80 of FIG. 4, the unmanned kiosk 100 may also communicate with various other computers over a variety of networks to provide functionality for obtaining an electronic travel reservation or checking in with an existing electronic travel reservation. By way of example, the unmanned kiosk 100 may communicate with a local server over a local network or a web service over the Internet using the network interfaces 26. The local server or the web service may track, for example, reservation information, whether a traveler has checked in, if the traveler has checked in any bags, and so forth.

In addition, traveler identification information, such as a photograph, fingerprint, or retinal scan, may be accessed from the local server or the web service for verification of the traveler's identity. The camera 36, a fingerprint scanner 106, and/or a retina scanner 108 may also be incorporated into the unmanned kiosk 100 to enable enhanced traveler identification for security purposes, as described in more detail below.

The unmanned kiosk 100 may also be communicatively coupled to a luggage scale 110. The scale may enable the unmanned kiosk 100 to assess fees for checked baggage, overweight baggage, and so forth. A credit card scanner 112 may also be incorporated into the unmanned kiosk 100 to enable the traveler to pay assessed fees via credit card.

Figure 6:
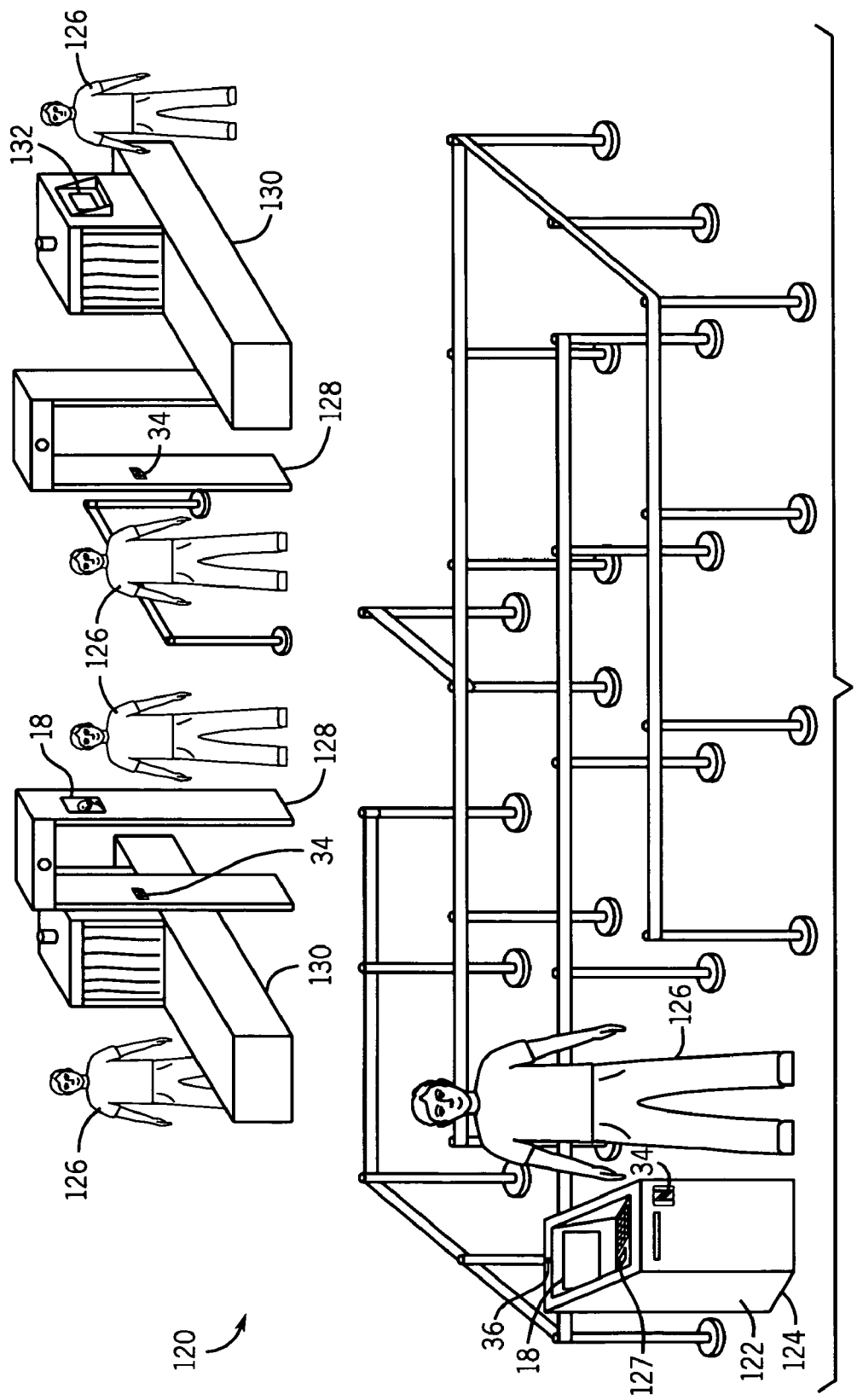
FIG. 6 is a perspective view of a transportation security checkpoint including embodiments of the electronic device of FIG. 1 in accordance with aspects of the present disclosure.

In FIG. 6, a security checkpoint 120 is illustrated. The security checkpoint 120 may include one or more embodiments of the electronic device 10 of FIG. 1. For example, a line entrance kiosk 122 may include the NFC interface 34 within an enclosure 124. The enclosure 124 may also house the display 18, which a security official 126 may monitor. A traveler may approach the line entrance kiosk 22 and move the handheld device 40 to within the range of the NFC interface 34 of the kiosk 122, as indicated by a label on the exterior of the enclosure 124. The kiosk 122 may then receive traveler identification information from the handheld device 40. For example, the traveler's name, picture, and description may be transmitted from the handheld device 40 to the kiosk 122. In another embodiment, a unique identifier may be transmitted from the handheld device to the line entrance kiosk 122, and the traveler's identification information may be downloaded from a networked database. As described above, the identification information may include a picture, description, fingerprint, retinal scan, and so forth. In some embodiments, a camera 36, fingerprint scanner 127, and/or retina scanner (not shown) may be incorporated into the line entrance kiosk 122 to enable automatic identity verification (e.g., via facial recognition, fingerprint comparisons, or retina comparisons). In the illustrated embodiment, the security official 126 may compare the traveler to a picture on the display 18 before allowing the traveler to stand in the line. The traveler may move the handheld device 40 within range of the kiosk 122 again to receive confirmation that the traveler's identification was checked.

The traveler may then proceed to a metal detector 128 and a carry-on luggage scanner 130. The traveler generally places any carry-on luggage on a conveyor belt to pass through the luggage scanner 130, which X-rays the luggage. Another security official 126 may monitor the progress of carry-on luggage through the scanner 130, for example, on a monitor 132. While the traveler's carry-on luggage is being examined, another security official 126 may observe as the traveler passes through the metal detector 128. To verify that the traveler's identification was checked at the line entrance kiosk 122, or in lieu of checking identification at the kiosk 122, the metal detector 128 may be another embodiment of the electronic device 10 of FIG. 1. That is, the metal detector 128 may include elements of the electronic device 10, such as the NFC interface 34 and the display 18. Upon approaching the metal detector 128, the traveler may move the handheld device 40 within range of the NFC interface 34, as noted by a label on the metal detector 128. The handheld device 40 may transmit a confirmation that the traveler's identification was verified at the line entrance kiosk 122. In another embodiment, the metal detector 128 may receive identification information from the handheld device, and the traveler's identification may be verified at the metal detector 128. That is, a picture of the traveler may be displayed on the display 18 for comparison to the traveler. In other embodiments, the metal detector 128 may include or may be coupled to a camera, a fingerprint scanner, a retina scanner, and so forth. In these instances, the traveler's identity may be confirmed via facial recognition software, fingerprint comparisons, or retina comparisons.

Figure 7:
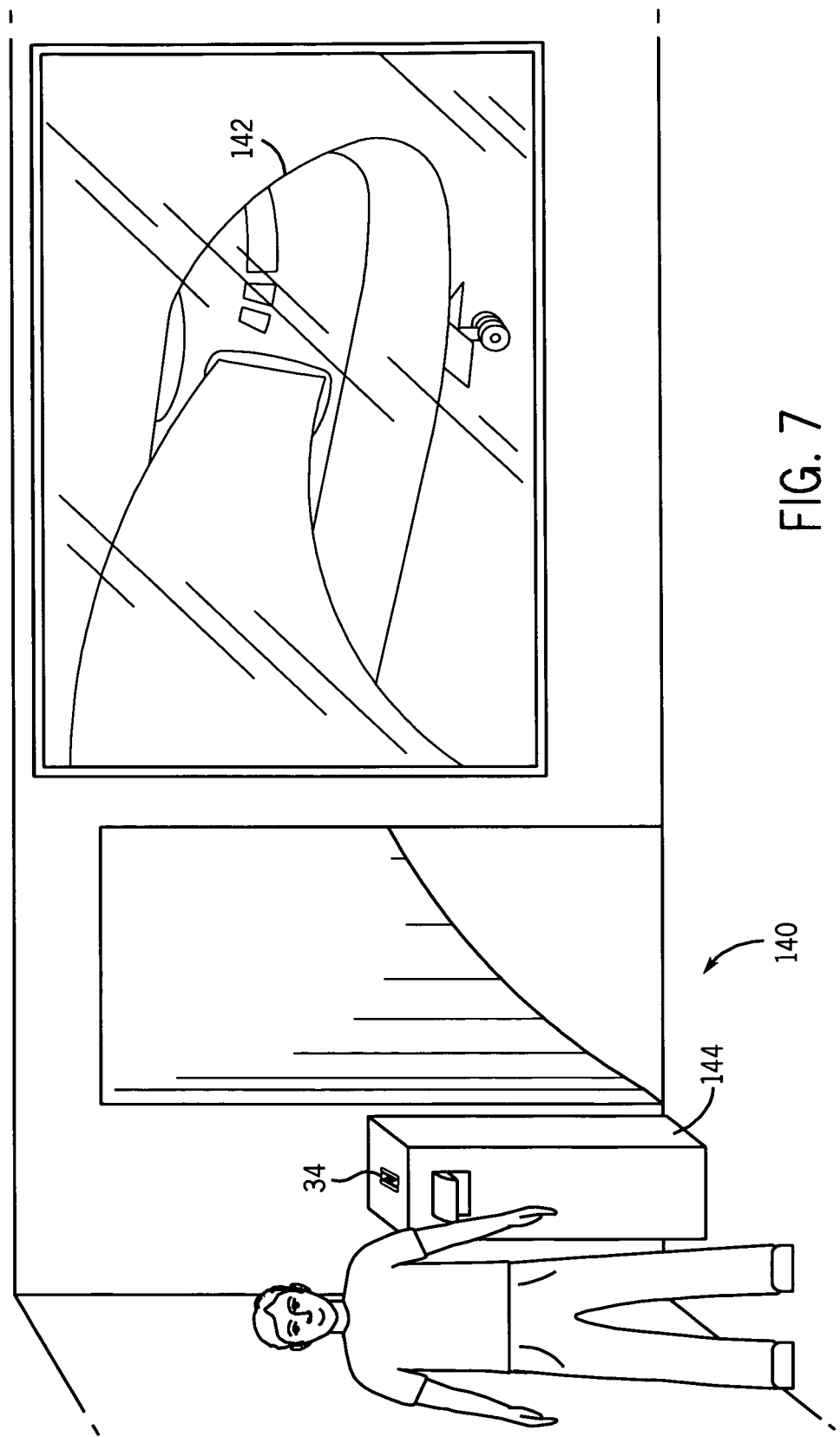
FIG. 7 is a perspective view of a boarding gate including an embodiment of the electronic device of FIG. 1 in accordance with aspects of the present disclosure.

After passing through the security checkpoint 120, the traveler may be required to present the travel reservation information and/or identification at a boarding gate 140, illustrated in FIG. 7, before boarding a transportation vehicle 142 (e.g., plane, train, bus, cruise ship, etc.). The boarding gate 140 may be equipped with another embodiment of the electronic device 10 of FIG. 1. For example, a boarding kiosk 144 may be placed next to an entrance to the transportation vehicle 142 to enable one last check of the traveler's documents before boarding. In the illustrated embodiment, the boarding kiosk 144 may include the NFC interface 34, denoted by a label on the kiosk 144, and one or more of the network interfaces 26. The traveler may move the handheld device 40 within range of the NFC interface 34 of the kiosk 144, for example, to verify that the correct vehicle is being boarded (e.g., to ensure the traveler is getting on the right flight) and to keep track of the travelers who have already boarded. To facilitate this oversight, the kiosk 144 may be in communication with a local server over a local network or a web service over the Internet using the network interfaces 26. In some embodiments, the kiosk 144 may also include the display 18 and/or other identification structures to enable further identity verification.

Figure 8:
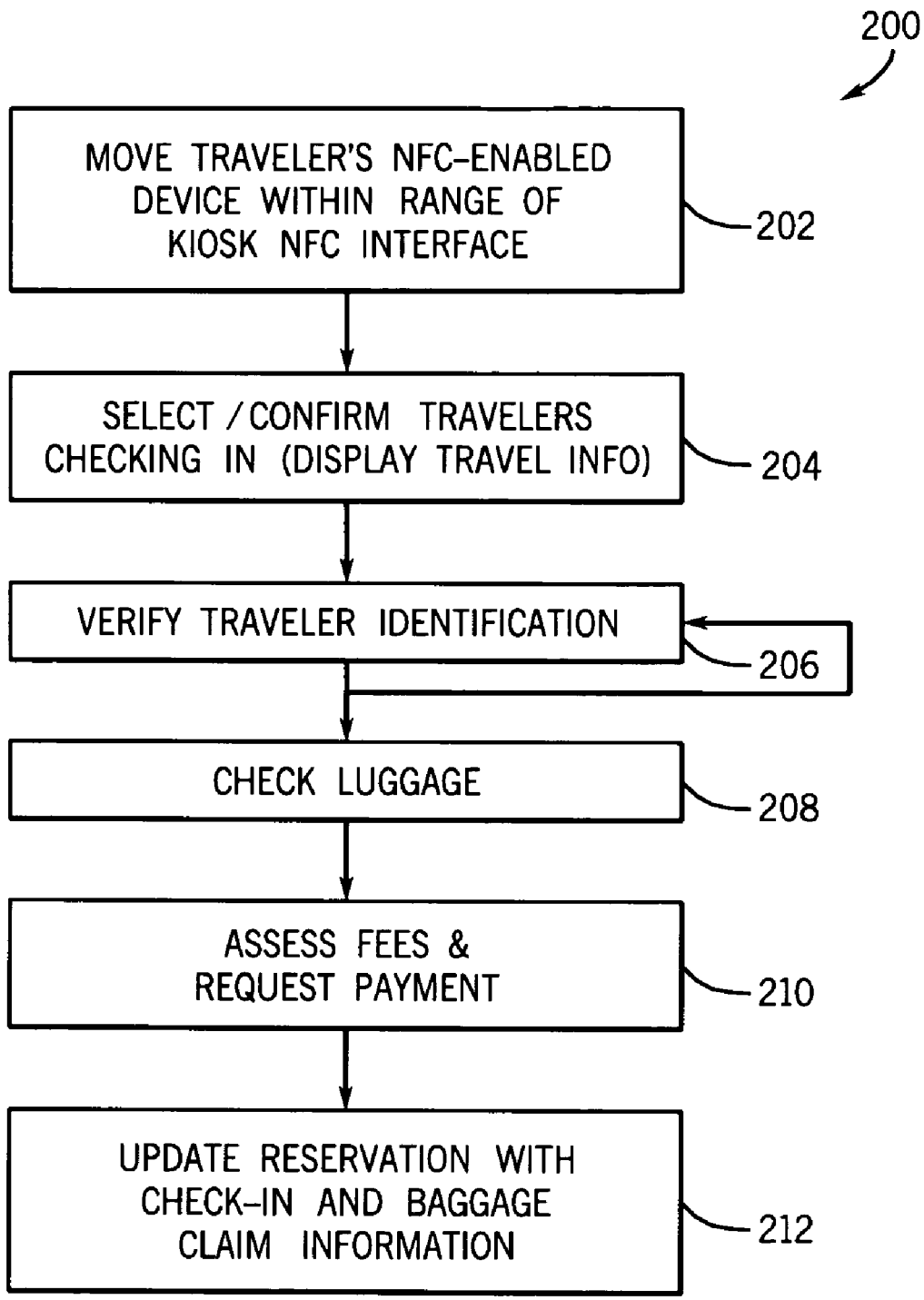
FIG. 8 is a flow chart of a travel check-in process using the electronic device of FIG. 1 in accordance with aspects of the present disclosure.
Figure 12:
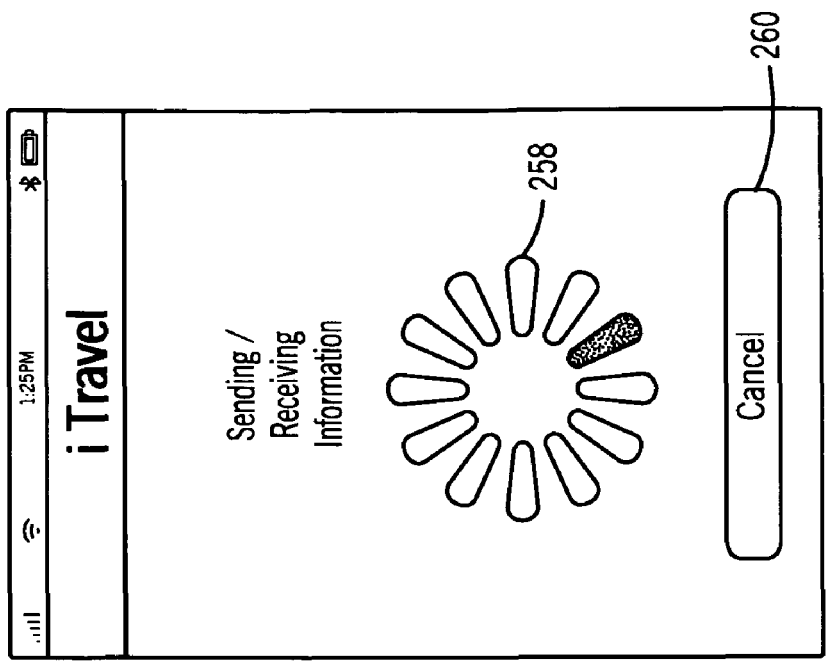

An exemplary process 200 for travel check-in is illustrated in FIG. 8. The check-in process 200 may be implemented at a check-in device, such as, for example, the ticketing and baggage check counter 78 of FIG. 4 or the unmanned kiosk 200 of FIG. 5. The traveler may approach a check-in device and optionally place luggage on a luggage scale. An NFC-enabled device, such that the handheld device 40, may be moved within range of an NFC interface in the check-in device (block 202). As described in more detail below, the check-in device may receive travel reservation information, such as a unique code, from the handheld device 40. The unique code may be used to look up travel information, for example, from a networked database of travel reservations.

The traveler's reservation information may then be accessed from the networked database. A display on the check-in device may provide a list of travelers associated with the reservation and prompt the traveler to select one or more individuals for check-in (block 204). For security purposes, the identity of the passengers checking in may be verified (block 206). A variety of identification verification methods may be employed. In a first embodiment, the traveler's handheld device 40 may include an electronic identification, such as a picture, a fingerprint, a retinal scan, and so forth. In this embodiment, security measures must be taken to ensure that the identifying information may not be altered. For example, a local, state, or federal government may provide a user with an electronic identification which may be stored on the handheld device 40. The electronic identification may include a picture, the user's full name and birth date, a digitized copy of the user's signature, a description of the user (e.g., height, weight, hair color, eye color, etc.), or any other identifying information. The traveler's identification may be provided by the handheld device 40 to the check-in device, whereby an agent or security official may examine the identification, for example, as displayed on a display.

In another embodiment of traveler identification verification (block 206), the check-in device may be connected to a local or remote server which contains user identification data. For example, the traveler's handheld device 40 may include a unique identifier, such as an alpha-numeric code, which is used to look up the traveler in a database. The database may contain identification information (e.g., picture, fingerprint, retinal scan, signature, description, etc.) which may then be accessed by the check-in device. Further, the database may be maintained by a government, a travel depot (e.g., an airport, a train station, a cruise terminal, a bus station, etc.), a travel provider (e.g., an airline, a train line, a cruise line, a bus company, etc.), or a third-party security company, for example. Providing identifying data to the database maintainer may be voluntary or mandatory. The traveler may be prompted to provide a photograph, a fingerprint, or a retina scan for comparison with stored identification information. The acquired photograph may be automatically compared to the traveler's identification photograph, for example, via facial recognition software. The scanned fingerprint or retina may also be automatically compared to identifying data stored in the database to verify the traveler's identity.

If more than one traveler is checking in, the passengers may go through the security verification process one-at-a-time. Upon verification of the first traveler, the second traveler may tap another handheld device 40 to the check-in device to initiate a similar identification verification process. This process (block 206) may be repeated until all of the selected passengers (block 204) are verified. If the additional passengers do not have NFC-enabled handheld devices 40, any suitable alternate identification method may be employed.

The traveler(s) may then indicate whether they have luggage to check (block 208). For example, if weight is detected on the scale, the check-in device may automatically prompt the traveler(s) to indicate how many bags are being checked. In another embodiment, the passengers may be prompted to indicate if any luggage will be checked (i.e., a yes/no question) and how many bags are being checked. Tags for the checked luggage may then be printed for placement on the bags, and identifying information on the tags may be associated with the traveler's reservation.

Additionally, some travel providers charge passengers a fee to check luggage. Fees may also be assessed for certain large and/or heavy checked items. Generally, payment is due at the time the luggage is checked, or during traveler check-in. Other fees may also be assessed at check-in, for example, if the traveler(s) request a different travel arrangement than originally reserved. Accordingly, after determining fees to be assessed, the traveler may be requested to pay the fees via the check-in device (block 210). For example, the traveler may be prompted to pay the assessed fess using a credit card or the NFC-enabled handheld device 40. That is, the traveler may be asked to select a payment method by choosing one of several options available. If the user selects to pay by credit card, the user may be prompted to insert a credit card into the check-in device, enter security information, and approve payment. In another embodiment, the user may select to pay fees via the handheld device 40, as described in U.S. patent application Ser. No. 12/286,488, entitled "PEER-TO-PEER FINANCIAL TRANSACTIONS," to Lin et al., filed on Sep. 30, 2008, now published as U.S. Patent Application Publication No. 2010/0082481 A1, the entirety of which is incorporated by reference herein.

Once check-in has been completed, the traveler may again move the handheld device 40 within range of the NFC interface of the check-in device to update the reservation data stored on the handheld device 40 (block 212). For example, the traveler's baggage claim information may be associated with the reservation data, and the data may be updated to indicate that the traveler went through the check-in process 200.

FIGS. 9-12 illustrate exemplary screen shots which may be accessed on the handheld device 40 during the check-in process 200 of FIG. 8. Upon selection of the travel management application icon 44 (FIG. 2), the travel management application is launched, an exemplary home screen 220 of which is illustrated in FIG. 9. The home screen 220 may be displayed when the travel management application begins to run on the handheld device 40. The home screen 220 may include a title bar 222, which may assist with navigation through the application. The home screen 220 may additionally include a number of user selectable buttons. A button 224 may be labeled "Make Reservation," and may provide access to online travel websites where a user may make a travel reservation (e.g., purchase a ticket, reserve a hotel room, book a rental car, etc.); a button 226 may be labeled "Retrieve Reservation," and may enable a user to add a previously-arranged travel reservation to the travel management application; a button 228 may be labeled "Review Reservation," and may enable a user to view the details of an existing reservation; a button 229 may be labeled "Share Reservation," and may enable a user to share the details of a reservation with another user; a button 230 may be labeled "Check In/Baggage Claim," and may enable a user to use a travel reservation (e.g., check in for a flight, check into a hotel room, etc.); a button 232 may be labeled "Identification," and may enable a user to provide identity verification data. An information button 234 may also enable the user to view information about the travel management application, get help using the application, change settings of the application, and so forth.

In order to check in, the traveler may select the "Check-In/Baggage Claim" button 230. A check-in/baggage claim screen 236, illustrated in FIG. 10, then provides a list of recent and future user-selectable reservations 238 stored in the travel management application. The user may be prompted to select a reservation by touching the details of that reservation. If the traveler has more reservations than will reasonably fit on the screen 236, multiple pages of the screen 236 may be employed. A page indicator 240 may indicate which page the traveler is on and how many other pages of reservations 238 are available. In the illustrated embodiment, the page indicator 240 may be a number of dots representing the number of pages available, with the displayed page indicated by a darkened dot. In other embodiments, the page indicator 240 may be numeric, such as "Page 3 of 5." The traveler may switch between pages by flicking the screen (i.e., holding a finger on the screen and sliding left or right quickly).

In addition to the reservations 238, the check-in/baggage claim screen 236 may include several user-selectable navigation buttons. A "Back" button 242 may enable the user to go back to the previous screen; a "Menu" button 244 may enable the user to return to the home screen 220 (FIG. 9A); a "Next" button 246 may enable the user to go to the following screen; and the information button 234 may open an information menu. The user may employ the "Back" button 242, for example, to verify or change an entry on a previous page. The "Next" button 246 may be available only when the user has used the "Back" button 242 and has not made any changes on a previous screen; otherwise, the screens may advance normally. The "Menu" button 244 may return the user to the home page 220 to restart the check-in or baggage claim process.

On the screen 236, the traveler may select the desired travel reservation 238. A reservation screen 248, illustrated in FIG. 11, may then display the selected reservation, a "Check In" button 250, an "Update" button 252, and a "Baggage Claim" button 254. Upon selection of the "Check In" button 250, the handheld device 40 may transmit the traveler's reservation information via the NFC interface 34 (FIGS. 1 and 2). A data transmission screen 256, illustrated in FIG. 12, may be displayed while the data is being transmitted. The screen 255 may indicate that information is being sent and/or received and may include a progress indicator 258 and a "Cancel" button 260. The progress indicator 258 may be animated to indicate when the handheld device 40 is transmitting data. If the animation stops, this may be an indication that the device 40 has stopped transmitting data. The "Cancel" button 260 may be used to stop transmission of data or to cancel the attempted transmission of data when it appears that the transmission is not going through.

If the handheld device 40 is within range of an NFC interface on a check-in device (e.g., the counter kiosk 80 or the unmanned kiosk 100), the check-in device may receive the NFC transmission from the handheld device 40 and initiate traveler check-in. In addition to the reservation information, the handheld device 40 may transmit the traveler's identification information. As discussed above, this information may include, for example, a picture, a description, a signature, a fingerprint, a retina scan, and so forth. In another embodiment, the handheld device may transmit a unique code which enables look-up of the traveler's identification information from a networked database.

Additionally, multiple travelers may travel on a single reservation, in which case the reservation information may be acquired from only the first traveler. However, all passengers may be required to provide identification during the check-in process 200 (FIG. 8, block 206). Multiple identifications may be stored on a single handheld device 40, or multiple devices 40 may be used to provide identity verification. For example, the first traveler may provide the reservation information to the check-in device. After the first traveler's identification has been verified, the second traveler may be asked to provide identification. In some instances, the second traveler's identification information may be stored on the handheld device 40 of the first traveler. In other embodiments, another handheld device 40 may contain the second traveler's identification information. If the traveler does not need to provide reservation information but merely needs to transmit identification information, the user may select the "Identification" button 232 from the home screen 220 (FIG. 9) to transmit identification information, as described below.

Figure 11:
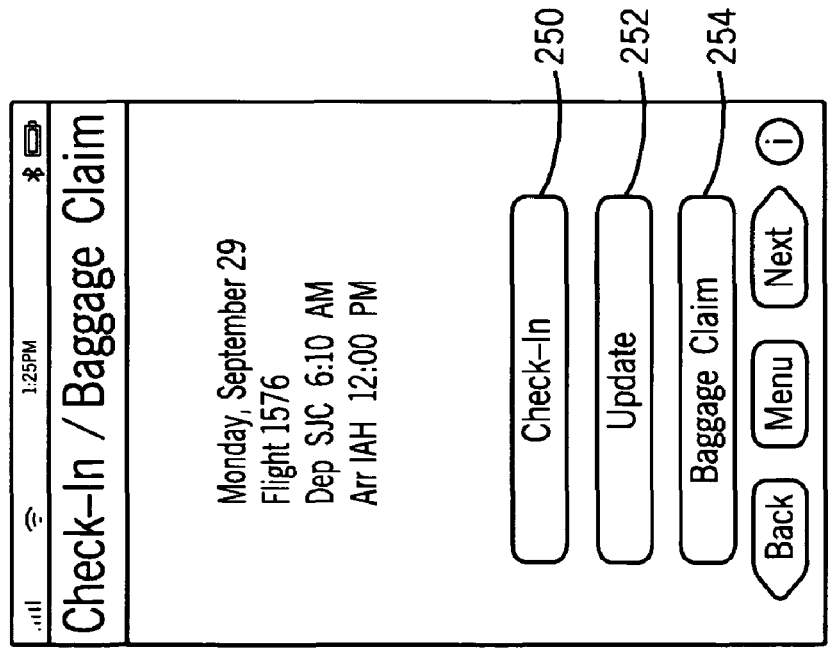

The reservation on the handheld device 40 may be updated via NFC or another network connection, such as an airport WAN. For example, after the traveler has checked in on the check-in device, baggage claim information may be transmitted from the check-in device to the handheld device 40 for storage with the reservation information. In addition, the reservation may be updated to indicate that the traveler checked in already. Even before the traveler checks in, the reservation may be updated to indicate, for example, the status or location of the mode of transportation. That is, the traveler may update a flight reservation upon entering the airport to determine if a flight is on time and the gate from which the flight will depart. This update may occur by pressing the "Update" button 252 on the reservation screen 248 (FIG. 11). The data transmission screen 256 (FIG. 12) may again be displayed to indicate that information is being sent and/or received by the handheld device.

Further, selection of the "Baggage Claim" button 254 on the reservation screen 248 may display the baggage claim information transmitted to the handheld device 40 during the update. The baggage claim information may include, for example, a list of identifying codes, bar codes, QR codes, or similar identifying information associated with the tags placed on the traveler's checked luggage (FIG. 8, block 208).

The "Check-In/Baggage Claim" and "Verify Identity" functions of the travel management application may also be used at the security checkpoint 120 and the boarding gate 140. The "Check In" function may be used to transmit reservation information and traveler identification information, whereas the "Verify Identity" function may be used to transmit just the traveler identification information, as needed.

Prior to check-in, the traveler may obtain travel reservations for storage on the handheld device 40 through a variety of sources. As illustrated on the home screen 220 (FIG. 9), the travel management application may include options to make a reservation (i.e., the "Make Reservation" button 224), to retrieve an existing reservation (i.e., the "Retrieve Reservation" button 226), to review reservations stored in the handheld device 40 (i.e., the "Review Reservation" button 228), and to share reservation details with other users (i.e., the "Share Reservation" button 229). In order to make a new reservation, the user may select the "Make Reservation" button 224 to access an exemplary reservation screen 262, illustrated in FIG. 13. The reservation screen 262 may include a number of user-selectable travel options from which the user may choose to make a reservation. For example, the reservation screen 262 may include a "Flight" button 264, a "Hotel" button 266, a "Car Rental" button 268, a "Cruise" button 270, a "Train" button 272, a "Bus" button 274, and so forth. The user may select the button corresponding to the type of travel reservation desired.

An exemplary search screen 274 is illustrated in FIG. 14. The search screen 274 is designed for a flight search; however, it should be understood that similar search screens may be presented for each type of travel reservation offered through the travel management application. On the search screen 276, text entry boxes 278 and 280 may enable the user to enter departure and destination cities/airports, respectively. A check-box 282 may be selected to search for additional nearby airports. Departure and return dates and times may be entered via drop-down menus 284, 286, 288, 290, 292, and 294. A check-box 296 may be selected to search for fares on surrounding dates. The number of adults, children, and seniors traveling may be entered via drop-down menus 298, 300, and 302, respectively. A check-box 304 may be selected to bring up an additional search screen (not shown) with more detailed search information, such as, for example, the number of stops desired, preferred airlines, service class, fare type, and so forth. A "Go" button 306 may be selected to initiate a search based on the entered parameters.

A departure screen 308, illustrated in FIG. 15, may display a list of flights matching the search parameters. If more flights are available than fit on the screen 308, multiple pages may be used. As described above, the user may move between pages by flicking the screen. After the user selects a departure flight, a similar screen (not shown) may display a list of return flights matching the search parameters. When the departure and arrival flights have been selected, a traveler information screen 310, illustrated in FIG. 16, may be displayed to enable entry of information for the passengers traveling in the reservation. Drop-down menus 312 may enable fast fill-in of the traveler information for passengers who have been previously saved on the handheld device 40. Text entry boxes 314 and 316 may enable the user to enter the first and last names, respectively, of each traveler. Radio buttons 318 may be selected to indicate a seat preference. Text entry boxes 320 may enable entry of the travelers' frequent flyer numbers. In addition, check-boxes 322 may be selected to save the traveler information for future inclusion in the drop-down menus 312. When the requested information has been entered, the user may press a "Go" button 324 to submit the traveler information.

Figures 17, 18:
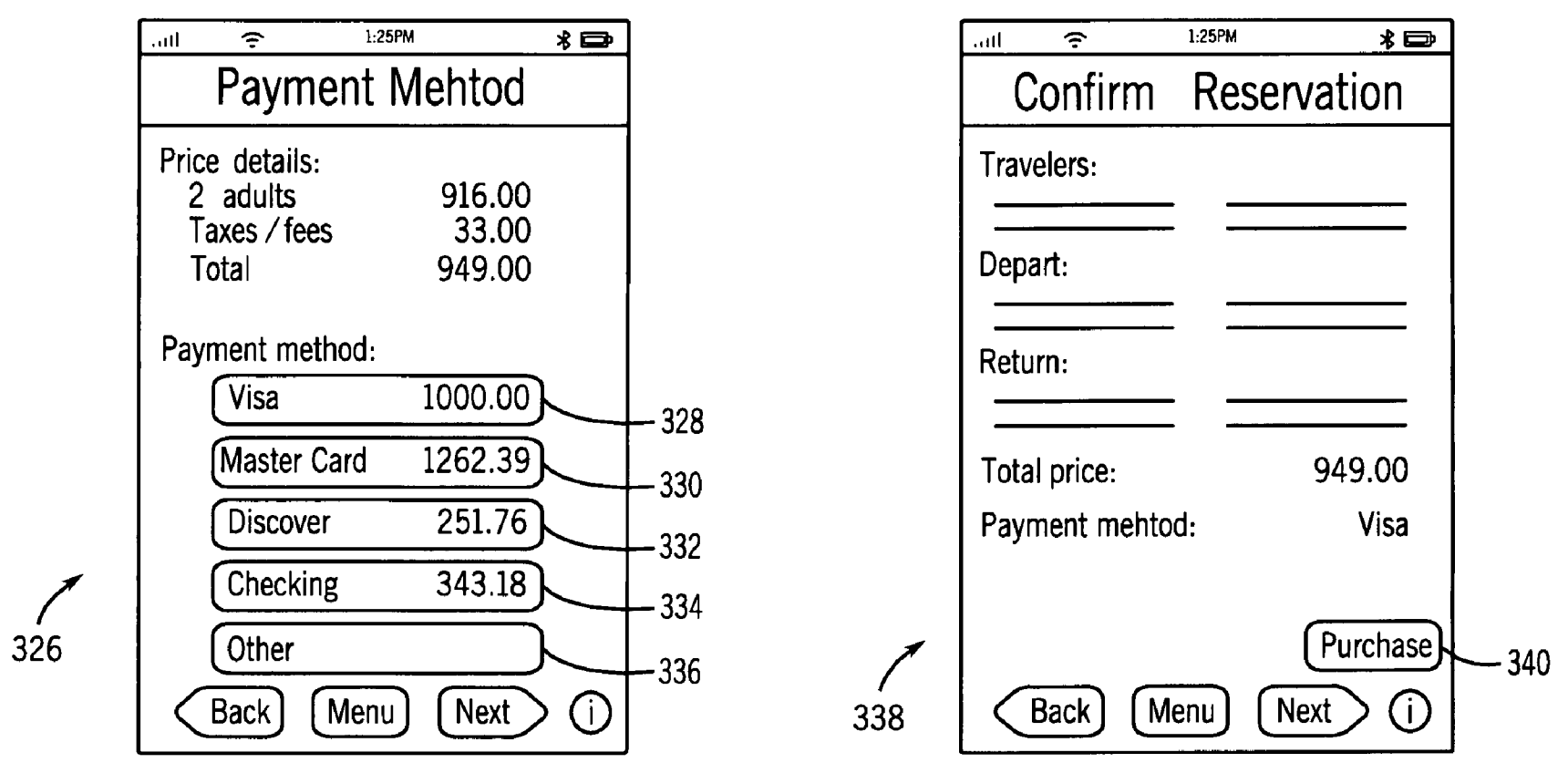

The travel management application may then request a payment method, as illustrated on a payment screen 326 in FIG. 17. In the illustrated embodiment, the user may have several credit cards and/or bank accounts stored on the handheld device 40 to enable purchases via the device 40. The stored payment methods may be displayed as user-selectable buttons on the screen 326. For example, a "Visa" button 328 may enable payment with a Visa credit or debit card; a "MasterCard" button 330 may enable payment with a MasterCard credit or debit card; a "Discover" button 332 may enable payment with a Discover credit card; and a "Checking" button 334 may enable payment directly from a checking account. In addition, the balances of the available payment methods may be displayed to facilitate the user's selection of a payment method. Additional payment options, such as, for example, Bill Me Later, PayPal, a frequent flyer account, an unsaved credit card, or additional saved accounts, may be accessed via an "Other" button 336.

FIG. 18 illustrates a reservation confirmation screen 338 which may be presented after the payment method is selected.

Figure 19:
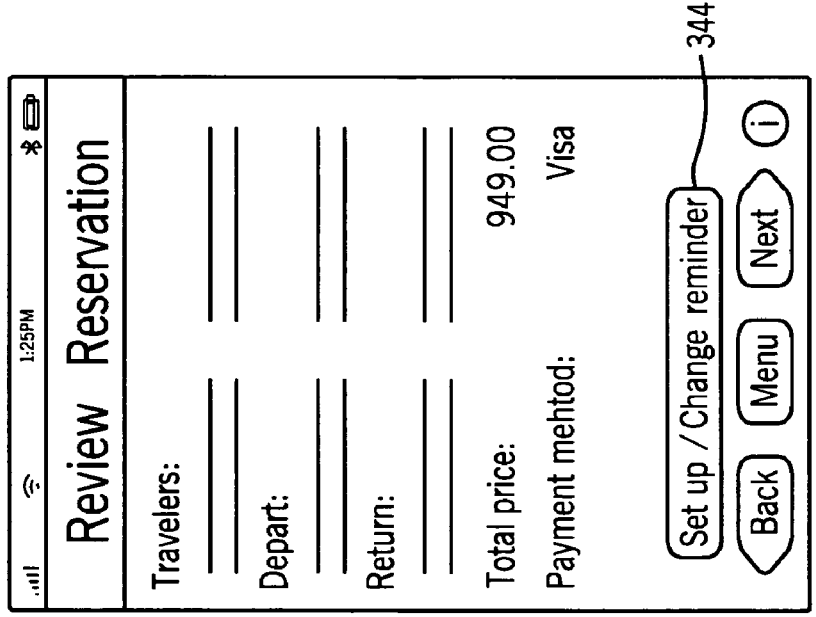

The reservation confirmation screen 338 may display the names of the travelers, the departure and return flight information, the total price for the reservation, and the selected payment method. A "Purchase" button 340 may initiate purchase of the selected reservation. For example, the reservation and payment information may be transmitted to a local server or a web service via the network connections 26. After making the reservation, a reservation review screen 342, illustrated in FIG. 19, may be displayed. The reservation review screen 342 may display the names of the travelers, the departure and return flight information, the total price for the reservation, and the selected payment method. In addition, a reminder button 344 may enable the user to set up or change one or more reminders associated with the reservation.

Figure 20:
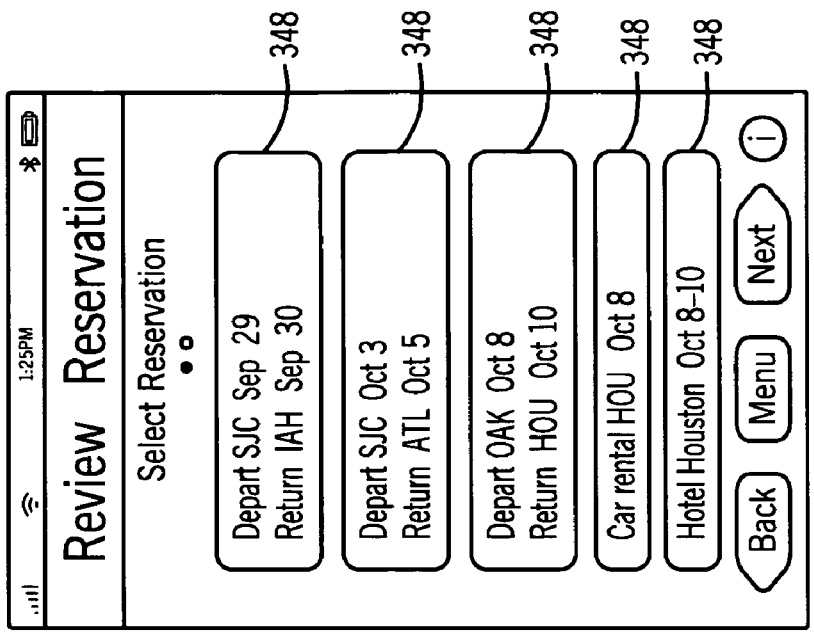
FIG. 20 is a schematic of a screen shot of a reservation review function of the travel management application on the electronic device of FIG. 1 in accordance with aspects of the present disclosure.

The reservation review screen 342 may also be accessed via the "Review Reservation" button 228 on the home screen 220 (FIG. 9). After pressing the "Review Reservation" button 228, a reservation selection screen 346, illustrated in FIG. 20, may display a list of the user's upcoming reservations as selectable buttons 348. Upon selection of the desired reservation button 348, the reservation review screen 342 (FIG. 19) may be displayed.

In addition to making a reservation via the handheld device 40, as described above, the user may retrieve an existing reservation by selecting the "Retrieve Reservation" button 226 from the home screen 220 (FIG. 9). A reservation retrieval screen 350 may then be displayed, as illustrated in FIG. 21. Several user-selectable buttons provide the user options for reservation retrieval. For example, an "Email" button 352 may enable reservation retrieval from an email message; a "Website" button 354 may enable reservation retrieval from a website; an "NFC Device" button 356 may enable reservation retrieval from another NFC-enabled electronic device 10, such as another handheld device 40, the computer 62, or the kiosks 80 or 100; and a "Confirmation No." button 358 may enable reservation retrieval from certain carriers using a provided confirmation or reservation number.

Selection of the "Email" button 352 may open an email search screen 360, illustrated in FIG. 22. The email search screen 360 may include search options, such as a drop-down menu 362 to select the email account which is to be searched and drop-down menus 364, 366, 368, 370, 372, and 374 to select a date range in which to search. A "Go" button 376 may initiate the search. The search results may be displayed on an email search result screen 378, illustrated in FIG. 23. The user may select the desired email to open a reservation details screen 380, illustrated in FIG. 24. Details of the reservation may be displayed on the reservation details screen 380. In addition, an "Add Reservation" button 382 may enable the user to add the reservation to the travel management application. The user may then check in to the reservation using the handheld device 40, as described above.

Figure 26:
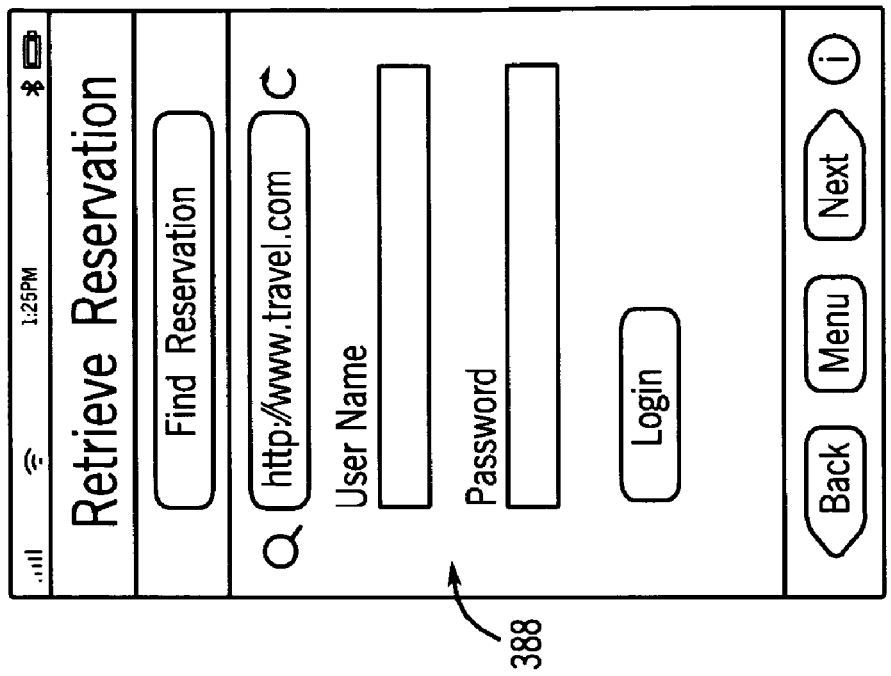
Figure 25:
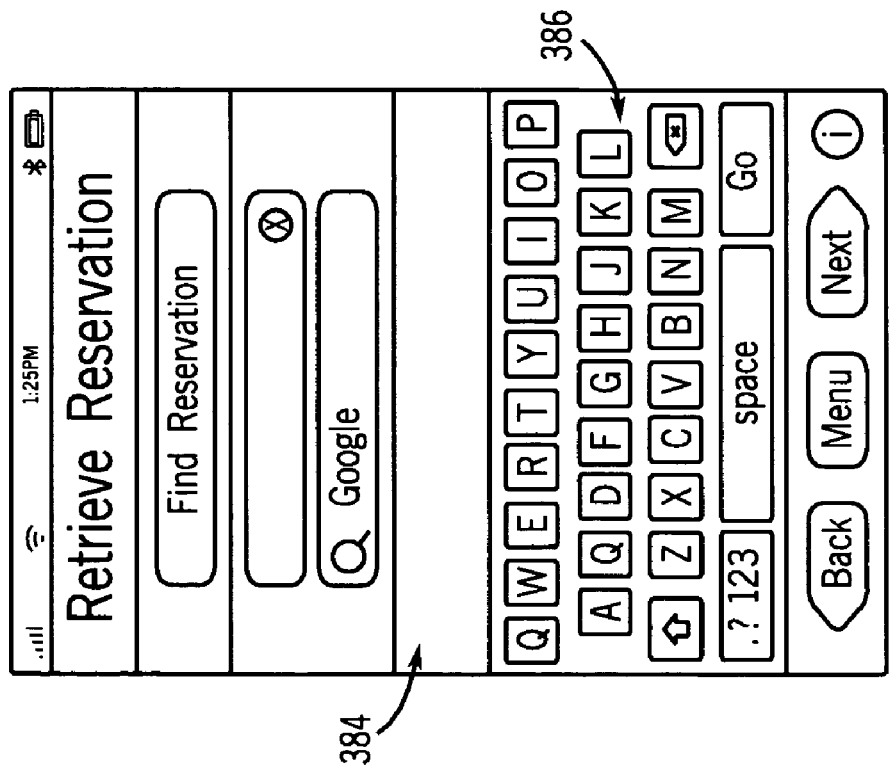
Figure 27:
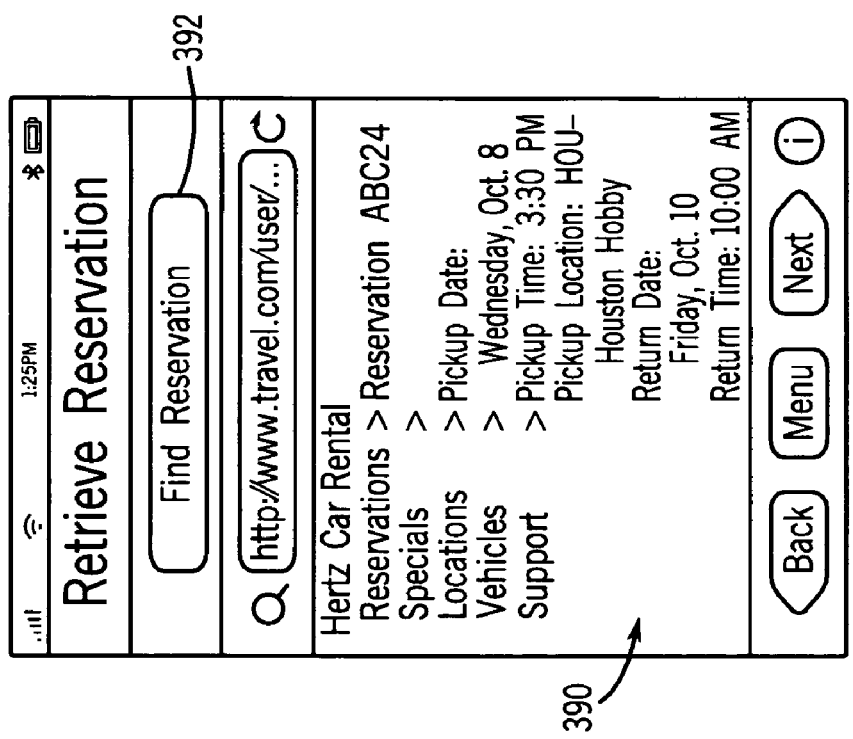

If the user elects to retrieve a reservation from a website and selects the "Website" button 354 (FIG. 21), a web browser 384 (e.g., Safari) may open inside the travel management application, as illustrated in FIG. 25. The user may be prompted to enter a website address or a search, for example, via a virtual QWERTY keyboard 386. The user may navigate to a registration retrieval or site login page 388, as illustrated in FIG. 26. After logging into the website or otherwise retrieving a reservation, as illustrated on a reservation page 390 in FIG. 27, the user may select a "Find Reservation" button 392. The "Find Reservation" button 392 may initiate a search of the open web page 390 to find reservation details. The reservation details screen 380 (FIG. 24) may then display the details found on the web page and the "Add Reservation" button 382 to enable the user to add the reservation to the travel management application. The user may then check in to the reservation using the handheld device 40, as described above.

Further, reservation retrieval from another NFC device may be initiated via selection of the "NFC Device" button 352 (FIG. 21). For example, a travel reservation may be shared between passengers, such as from one handheld device 40 to another handheld device 40 (e.g., by selecting the "Share Reservation" button 229 (FIG. 9)). In another embodiment, a traveler may make a reservation via the computer 62 (FIG. 3), the counter kiosk 80 (FIG. 4), the unmanned kiosk 100 (FIG. 5), or another NFC-enabled device 10, and share the reservation with the handheld device 40.

Figure 28:
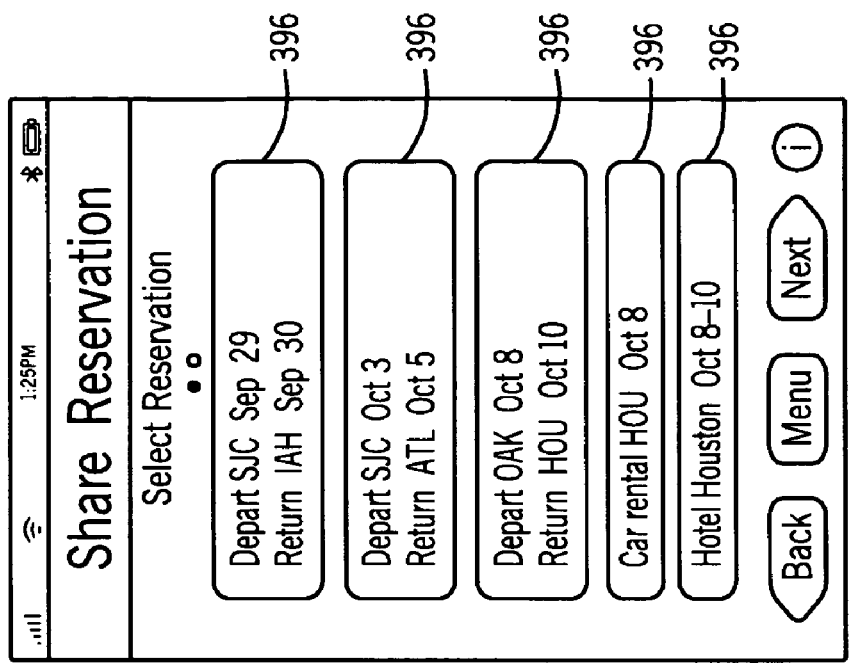

In an exemplary embodiment in which a reservation is shared between handheld devices 40, a user may select the "Share Reservation" button 229 from the travel reservation management application home screen 220 (FIG. 9) on one handheld device 40, and another user may select the "NFC Device" button from the reservation retrieval screen 350 (FIG. 21) on another handheld device 40. Selecting the "Share Reservation" button 229 may open a screen 394, illustrated in FIG. 28, displaying a list of the user's upcoming reservations as selectable buttons 396. The user may select one of the reservation buttons 396, at which time a sharing screen 398, illustrated in FIG. 29, may open. The sharing screen 398 may display the reservation information and a button 400 labeled, for example, "Share this Reservation." The handheld device 40 may then transmit the details of the selected reservation via NFC. In an exemplary embodiment, the data transmission screen 256 (FIG. 12) may be displayed while the reservation information is transmitted.

In addition, another user may activate another handheld device 40 to receive the shared reservation information by selecting the "NFC Device" button from the reservation retrieval screen 350 (FIG. 21). A searching screen 402 may be displayed, as illustrated in FIG. 30. The searching screen may display a progress indicator 404 and a "Cancel" button 406. Upon locating a travel reservation transmission, the reservation details screen 380 (FIG. 24) may be displayed. The user may add the reservation by selecting the "Add Reservation" button 382. Thereafter, the user may check in to the reservation using the handheld device 40, as described above.

Figure 31:

In a further embodiment, a user may retrieve a reservation using a confirmation or reservation number, for example, by selecting the "Confirmation No." button 358 from the reservation retrieval screen 350 (FIG. 21). A custom interface 408 (e.g., rather than a web browser), illustrated in FIG. 31, may be used to access reservations in this embodiment. For example, the custom interface 408 may include one or more drop-down menus to enable the user to select supported carriers. A reservation type menu 410 may include, for example, flight, hotel, car rental, cruise, train, bus, and so forth. A carrier menu 412 may include specific companies for which the custom interface 408 is enabled. In addition, the carrier menu 412 may change based on the selection of the reservation type from the menu 410. That is, if "Flight" is selected in the type menu 410, airlines may be listed in the carrier menu 412, whereas if "Hotel" is selected in the type menu 410, hotel brands may be listed in the carrier menu 412. A text entry box 414 may enable the user to enter a confirmation or reservation number obtained from the carrier. Additionally, a text entry box 416 may enable the user to enter a name under which the reservation was made. Text entry may be via a virtual QWERTY keyboard 418. When the reservation is found, the reservation details screen 380 (FIG. 24) may be displayed. The user may add the reservation to the travel management application by selecting the "Add Reservation" button 382.

The reservation may then be available on the handheld device 40 for check-in, as described above.

Figure 32:
FIG. 32 is a schematic of a screen shot for an identification management function of the travel management application on the electronic device of FIG. 1 in accordance with aspects of the present disclosure.

As discussed above, in addition to storing travel reservations, the travel management application may be used to store and transmit a user's identification. It should be noted that, for security purposes, the identifications may not be altered but rather may be merely added and/or deleted from the handheld device 40. One or more profiles may be stored on the handheld device 40. For example, a minor's identification information may be stored on a guardian's handheld device 40. Various identification methods may be employed, as described above. In order to store identification on the handheld device, the user may select the "Identification" button 232 from the travel management application home screen 220 (FIG. 9). An identification options screen 420 may then be displayed, as illustrated in FIG. 32. The identification options screen 420 may include user-selectable buttons, such as, for example, a "Load Identification" button 422; a "Transmit Identification" button 424; and a "Delete Identification" button 425.

Selection of the "Load Identification" button 422 may open a screen 426, illustrated in FIG. 33, from which the user may select a "Scan ID" button 428 or an "Enter ID Number" button 430. If the user selects the "Scan ID" button 428, a screen 432, illustrated in FIG. 34, may prompt the user to enter a nickname for the identification into a text entry box 434 and then press a "Scan" button 436 to search for nearby RFID-equipped identification (e.g., a passport or driver's license). Nickname entry may be enabled via a virtual QWERTY keyboard 438. The data transmission screen 256 (FIG. 12) may be displayed while the handheld device 40 searches for the identification information. Upon locating the information, an identification summary screen 440, illustrated in FIG. 35, may be displayed. The user may add the identification information to the handheld device 40 by selecting an "Add Identification" button 442.

Figures 35, 36:

If the user selects the "Enter ID Number" button 430 from the screen 426 (FIG. 33), an entry screen 444, illustrated in FIG. 36, may be displayed. The entry screen 444 may include, for example, a nickname text entry box 446, an identification type drop-down menu 448, an authority drop-down menu 450, and an identification number text entry box 452. Text entry may be facilitated by a virtual QWERTY keyboard 454. Again, the user may enter a nickname for the identification in the text entry box 446. The identification type drop-down menu 448 may include options such as "Passport" and "Driver's License." The authority drop-down menu 450 may be based on the identification type drop-down menu 448 and may include, for example, countries and/or states. The identification number text entry box 452 may enable entry of an identification number from the user's identification, such as a passport number or a driver's license number. In the illustrated embodiment, the user may enter the requested information then press a "Go" button to initiate a search for the desired identification. For example, the travel management application may contact the selected authority to download user identification based on the entered information. An additional security code may be required to receive the information electronically. The identification summary screen 440 (FIG. 35) may then be displayed, and the identification information may be added to the handheld device 40 by selection of the "Add Identification" button 442.

In order to submit identification information, the user may select the "Transmit ID" button from the identification options screen 420 (FIG. 32). An identification selection screen 458, illustrated in FIG. 37, may then be displayed containing a list of user-selectable identification buttons 460.

The user may select the desired identification button 460, at which time an identification transmission screen 462, illustrated in FIG. 38, may be displayed. The identification transmission screen 462 may include a "Transmit" button 464 to enable transmission of the selected identification. The data transmission screen 256 (FIG. 12) may be displayed while the identification information is transmitted.

Figure 39:
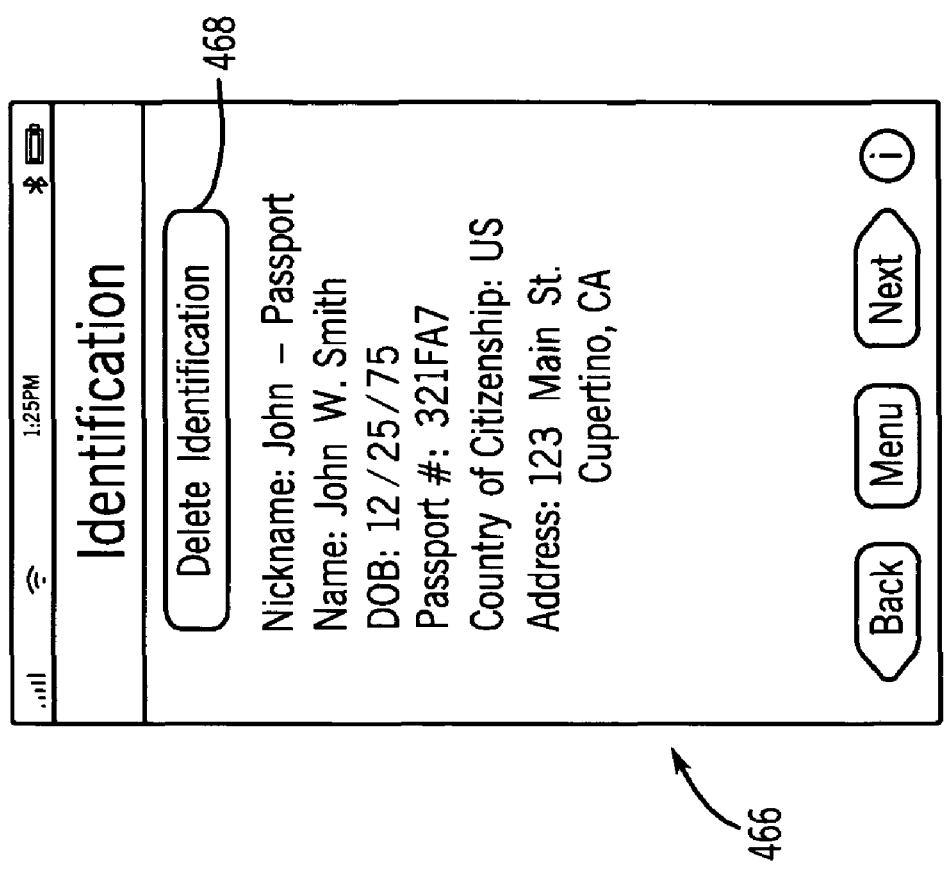
FIG. 39 is a schematic of a screen shot for an identification deletion function of the travel management application on the electronic device of FIG. 1 in accordance with aspects of the present disclosure.

In addition to adding identifications to the handheld device 40, it may be desirable to delete obsolete identifications. Accordingly, the user may select the "Delete Identification" button 425 from the identification options screen 420 (FIG. 32). The identification selection screen 458 (FIG. 37) may then be displayed. The user may select the desired identification button 460 to open a deletion screen 466, illustrated in FIG. 39. A "Delete Identification" button 468 may enable the user to remove an identification from the handheld device 40.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for transportation ticketing check-in, comprising:
   prompting a traveler to place a handheld electronic device comprising a display and a plurality of wireless communication interfaces within range of a near field communication (NFC) reader, wherein the display is configured to display a graphical user interface, wherein each of the plurality of wireless communication supports a respective communication protocol, and wherein one of the plurality of wireless communication interfaces comprises an NFC interface;
   retrieving ticketing and traveler identification information from the NFC interface of the handheld electronic device via the NFC reader; and
   verifying the traveler's identity using the retrieved traveler identification, wherein verifying the traveler's identity comprises comparing a photograph retrieved from the handheld electronic device to the traveler.

2. The method of claim 1, wherein verifying the traveler's identity comprises downloading a photograph of the traveler from a database using an identification code retrieved from the handheld electronic device.

3. The method of claim 1, wherein verifying the traveler's identity comprises:
   downloading a fingerprint from a database using an identification code retrieved from the handheld electronic device; and
   comparing the downloaded fingerprint to a scanned fingerprint provided by the traveler at check-in.

4. The method of claim 1, wherein verifying the traveler's identity comprises:
   downloading a first retinal scan from a database using an identification code retrieved from the handheld electronic device; and
   comparing the downloaded first retinal scan to a second retinal scan provided by the traveler at check-in.

5. The method of claim 1, comprising:
   prompting the traveler to place the handheld electronic device within range of the NFC reader again after successfully checking in; and updating the ticketing information on the handheld electronic device to indicate that the traveler checked in successfully.

6. The method of claim 5, wherein updating the ticketing information comprises storing information about checked luggage on the handheld electronic device.

7. The method of claim 1, wherein the ticketing information comprises a reservation for a flight, car rental, cruise, train, bus, or a combination thereof.

8. The method of claim 1, wherein, in addition to the NFC interface, the plurality of wireless communication interfaces comprises a Wi-Fi communication interface, a cellular data communication interface, or a combination thereof.

9. A handheld electronic device comprising tangible, machine-readable media, comprising code executable to perform the steps of:
booking a travel reservation for a mode of transportation using a travel management application on the handheld electronic device;
scanning an email account on the handheld electronic device for an email containing the travel reservation;
importing the travel reservation information from the email into the travel management application;
storing the travel reservation on the handheld electronic device;
accessing the travel reservation using the travel management application;
transmitting the travel reservation from the handheld electronic device to a check-in kiosk;
receiving check-in details from the check-in kiosk to the handheld electronic device; and
transmitting the check-in details from the handheld electronic device to a gate kiosk to gain entrance to the mode of transportation.

10. The handheld electronic device of claim 9, wherein the tangible, machine-readable media comprises code executable to perform the steps of:
accessing the travel reservation from a website; and
importing the travel reservation information from the website into the travel management application.

11. The handheld electronic device of claim 9, wherein the tangible, machine-readable media comprises code executable to perform the steps of:
receiving the travel reservation via NFC from another NFC-enabled electronic device; and
importing the travel reservation information from the other NFC-enabled electronic device into the travel management application.

12. The handheld electronic device of claim 9, wherein the tangible, machine-readable media comprises code executable to perform the step of retrieving the travel reservation via the travel management application using a carrier-provided confirmation number.

13. The handheld electronic device of claim 9, wherein at least one of transmitting the travel reservation from the handheld electronic device to a check-in kiosk, receiving check-in details from the check-in kiosk to the handheld electronic device, and transmitting the check-in details from the handheld electronic device to a gate kiosk to gain entrance to the mode of transportation, occurs via near-field communication (NFC).

14. A method for transportation ticketing check-in, comprising:
prompting a traveler to place a handheld electronic device comprising a display and a plurality of wireless communication interfaces within range of a near field communication (NFC) reader, wherein the display is configured to display a graphical user interface, wherein each of the plurality of wireless communication supports a respective communication protocol, and wherein one of the plurality of wireless communication interfaces comprises an NFC interface;
retrieving ticketing and traveler identification information from the NFC interface of the handheld electronic device via the NFC reader; and
verifying the traveler's identity using the retrieved traveler identification, wherein verifying the traveler's identity comprises downloading a photograph of the traveler from a database using an identification code retrieved from the handheld electronic device.

15. A method for transportation ticketing check-in, comprising:
prompting a traveler to place a handheld electronic device comprising a display and a plurality of wireless communication interfaces within range of a near field communication (NFC) reader, wherein the display is configured to display a graphical user interface, wherein each of the plurality of wireless communication supports a respective communication protocol, and wherein one of the plurality of wireless communication interfaces comprises an NFC interface;
retrieving ticketing and traveler identification information from the NFC interface of the handheld electronic device via the NFC reader; and
verifying the traveler's identity using the retrieved traveler identification, wherein verifying the traveler's identity comprises:
downloading a fingerprint from a database using an identification code retrieved from the handheld electronic device; and
comparing the downloaded fingerprint to a scanned fingerprint provided by the traveler at check-in.

16. A method for transportation ticketing check-in, comprising:
prompting a traveler to place a handheld electronic device comprising a display and a plurality of wireless communication interfaces within range of a near field communication (NFC) reader, wherein the display is configured to display a graphical user interface, wherein each of the plurality of wireless communication supports a respective communication protocol, and wherein one of the plurality of wireless communication interfaces comprises an NFC interface;
retrieving ticketing and traveler identification information from the NFC interface of the handheld electronic device via the NFC reader; and
verifying the traveler's identity using the retrieved traveler identification, wherein verifying the traveler's identity comprises:
downloading a first retinal scan from a database using an identification code retrieved from the handheld electronic device; and
comparing the downloaded first retinal scan to a second retinal scan provided by the traveler at check-in.

17. A handheld electronic device comprising tangible, machine-readable media, comprising code executable to perform the steps of:
booking a travel reservation for a mode of transportation using a travel management application on the handheld electronic device;
accessing the travel reservation from a website;
importing the travel reservation information from the website into the travel management application;

storing the travel reservation on the handheld electronic device;

accessing the travel reservation using the travel management application;

transmitting the travel reservation from the handheld electronic device to a check-in kiosk;

receiving check-in details from the check-in kiosk to the handheld electronic device; and transmitting the check-in details from the handheld electronic device to a gate kiosk to gain entrance to the mode of transportation.

* * * * *